(12) United States Patent
Walter et al.

(10) Patent No.: US 9,798,055 B2
(45) Date of Patent: Oct. 24, 2017

(54) OPTICALLY VARIABLE ELEMENT

(71) Applicant: OVD Kinegram AG, Zug (CH)

(72) Inventors: Harald Walter, Horgen (CH); Wayne Robert Tompkin, Baden (CH); Sebastian Mader, Lucerne (CH)

(73) Assignee: OVD KINEGRAM AG, Zug (CH)

( * ) Notice: Subject to any disclaimer, the term of this patent is extended or adjusted under 35 U.S.C. 154(b) by 198 days.

(21) Appl. No.: 14/361,098

(22) PCT Filed: Nov. 28, 2012

(86) PCT No.: PCT/EP2012/073855
§ 371 (c)(1),
(2) Date: May 28, 2014

(87) PCT Pub. No.: WO2013/079542
PCT Pub. Date: Jun. 6, 2013

(65) Prior Publication Data
US 2014/0346766 A1    Nov. 27, 2014

(30) Foreign Application Priority Data

Nov. 29, 2011 (DE) .......................... 10 2011 119 598

(51) Int. Cl.
*G02B 5/18* (2006.01)
*G02B 5/28* (2006.01)
(Continued)

(52) U.S. Cl.
CPC .............. *G02B 5/285* (2013.01); *B42D 25/29* (2014.10); *B42D 25/405* (2014.10); *G02B 5/00* (2013.01);
(Continued)

(58) Field of Classification Search
CPC ........... G02B 5/28; G02B 5/285; G02B 5/287
(Continued)

(56) References Cited

U.S. PATENT DOCUMENTS 3,858,977 A    1/1975 Baird et al.
5,731,898 A *  3/1998 Orzi ........................ G09F 13/06
                                            359/585
(Continued)

FOREIGN PATENT DOCUMENTS

DE        10232245       2/2004
DE       10201047250     6/2011
(Continued)

*Primary Examiner* — Audrey Y Chang
(74) *Attorney, Agent, or Firm* — Hoffmann & Baron, LLP

(57) ABSTRACT

The invention relates to an optically variable element as well as a method for the production thereof. In a first area the optically variable element has at least one first color region which in the event of illumination generates a color dependent on the angle of observation and/or angle of illumination. The first color region has two or more zones (41 to 47) arranged next to each other. The two or more zones arranged next to each other have in each case a width and/or length dimension of less than 300 μm. In at least one first zone (41) of the zones (41 to 47) of the first color region a thin-film interference filter (15) is provided with at least one interference layer (17). The interference layer (17) of the thin-film interference filter (15) has a first average thickness ($d_1$) in the first zone (41). The first average thickness is chosen such that the thin-film interference filter (15) in the event of illumination at least one particular angle of observation and/or angle of illumination generates, by means of interference, a color which differs from at least one color which is generated in the event of illumination at this angle of observation and/or angle of illumination in at least one of the other zones (42 to 47) of the first color region.

15 Claims, 25 Drawing Sheets

(51) Int. Cl.
*B42D 25/29* (2014.01)
*G02B 5/00* (2006.01)
*B42D 25/405* (2014.01)

(52) U.S. Cl.
CPC ............ *G02B 5/286* (2013.01); *G02B 5/287* (2013.01); *B42D 2033/24* (2013.01); *B42D 2035/14* (2013.01); *B42D 2035/24* (2013.01)

(58) Field of Classification Search
USPC ... 359/571, 572, 573, 576, 580, 582, 585, 2, 359/587, 567; 283/72, 107
See application file for complete search history.

(56) References Cited

U.S. PATENT DOCUMENTS

| | | | | |
|---|---|---|---|---|
| 5,877,895 | A * | 3/1999 | Shaw | G02B 5/287 359/585 |
| 7,560,156 | B2 * | 7/2009 | Reinhart | D21H 21/42 283/107 |
| 7,630,109 | B2 * | 12/2009 | Phillips | B42D 25/328 283/91 |
| 2005/0175815 | A1 | 8/2005 | Wild et al. | |
| 2006/0285184 | A1 | 12/2006 | Phillips et al. | |
| 2011/0069391 | A1 | 3/2011 | Melman | |
| 2012/0319395 | A1 | 12/2012 | Fuhse et al. | |

FOREIGN PATENT DOCUMENTS

| | | |
|---|---|---|
| EP | 1498545 | 1/2005 |
| WO | WO 01/53113 | 7/2001 |
| WO | WO 2008/011919 | 1/2008 |
| WO | WO 2010/037638 | 4/2010 |

\* cited by examiner

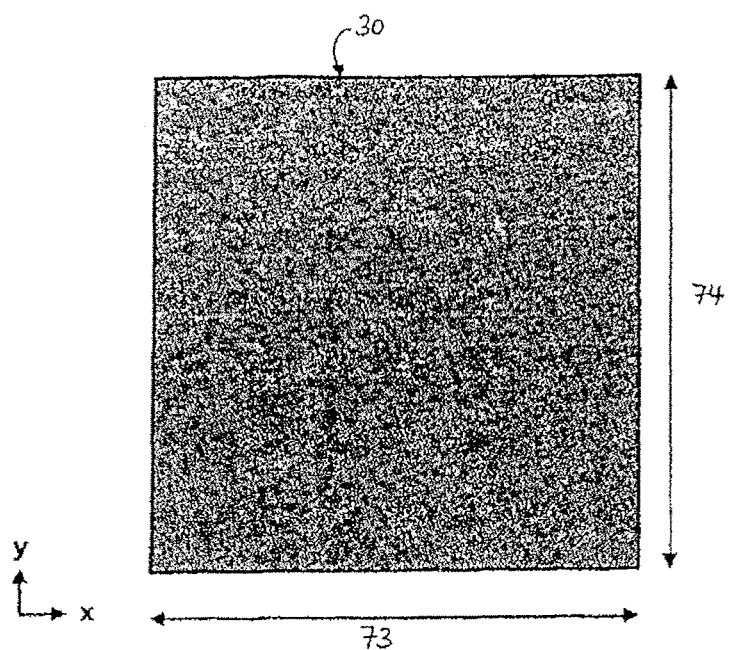
Fig. 2b1
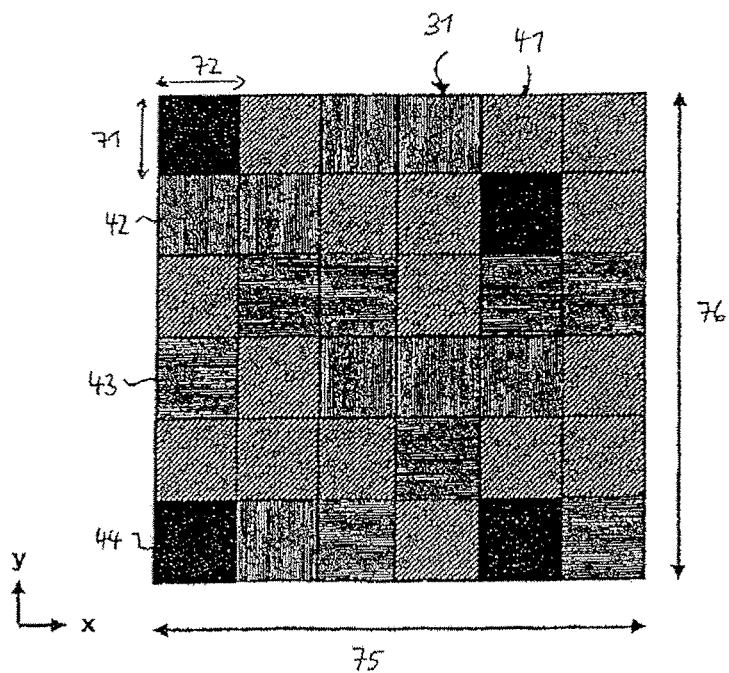
Fig. 2b2

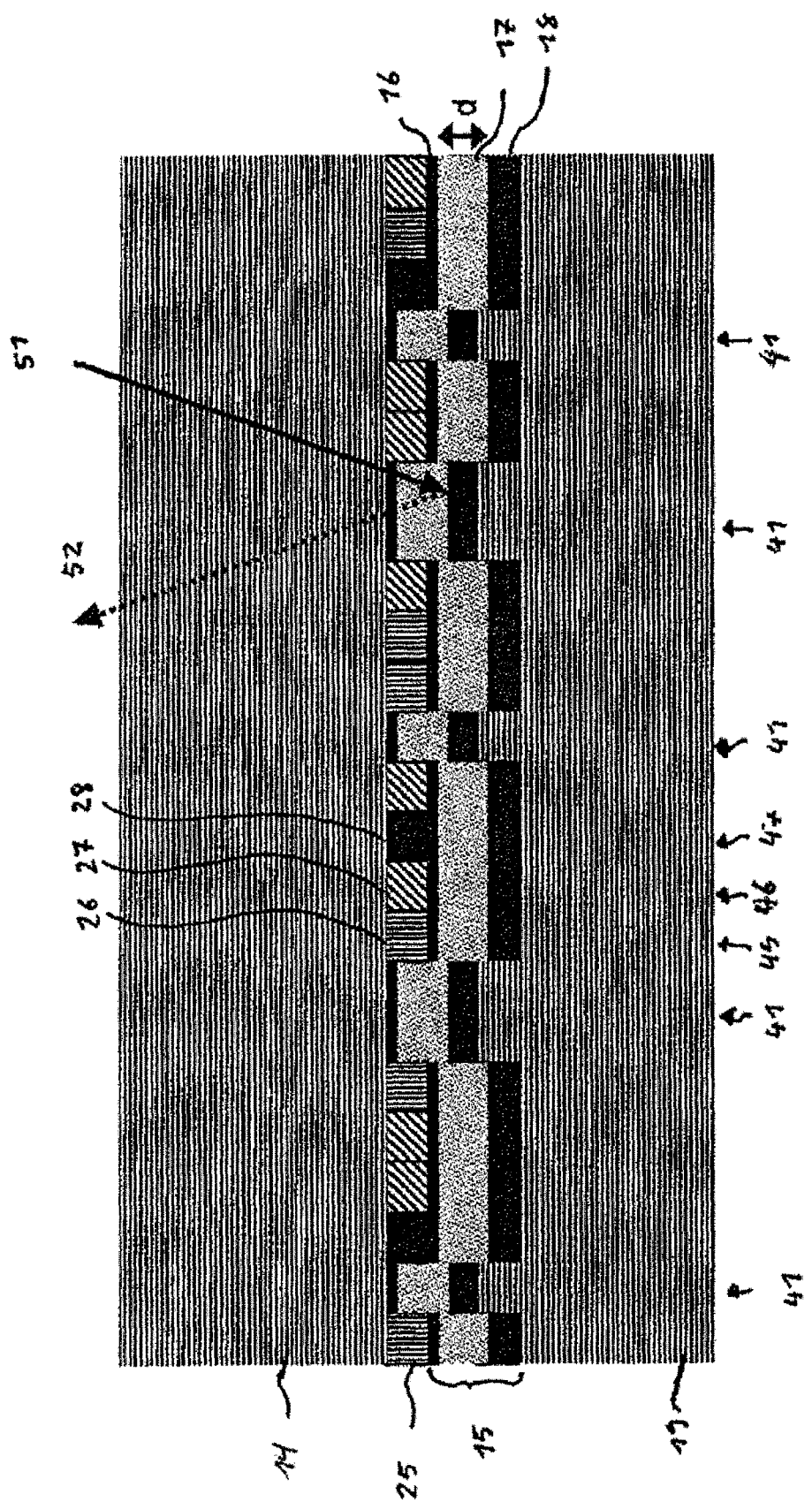

OPTICALLY VARIABLE ELEMENT

The invention relates to an optically variable element, in particular an optically variable security element, as well as a method for the production thereof.

The generation of optically variable effects by means of thin-film interference filters is described for example in U.S. Pat. No. 3,858,977. Here a thin-film interference filter is constructed from several layers including an interference layer. The incident light is at least partially reflected at the front and back side of the interference layer. Due to the small thickness of the interference layer, a destructive or constructive interference of the reflected light takes place for particular wavelengths in the range of visible light, with the result that the thin-film interference filter displays a colored appearance. Because of the path length, which changes depending on the angle of observation and/or angle of illumination, of the light in the interference layer, the color of the thin-film interference filter changes correspondingly depending on the angle of observation and/or angle of illumination, with the result that in the event of illumination such a filter generates a color dependent on the angle of observation and/or angle of illumination as an optically variable effect.

The object of the invention now is to provide an optically variable element as well as a method for the production thereof, which is characterized by improved optical properties.

This object is achieved by an optically variable element, in particular an optically variable security element, which in a first area has at least one first color region which in the event of illumination generates a color dependent on the angle of observation and/or angle of illumination, wherein the first color region has two or more zones arranged next to each other which have in each case a width and/or length dimension of less than 300 μm, wherein in at least one first zone of the zones of the first color region a thin-film interference filter is provided with at least one interference layer which in the first zone has a first average thickness which is chosen such that in the event of illumination at least one particular angle of observation and/or angle of illumination in the first zone the thin-film interference filter generates, by means of interference, a color which differs from at least one color which is generated in at least one of the other zones of the first color region in the event of illumination at this angle of observation and/or angle of illumination. This object is further achieved by a method for the production of an optically variable element which in a first area has at least one first color region which in the event of illumination generates a color dependent on the angle of observation and/or illumination, wherein, in two or more zones arranged next to each other of the first color region which have in each case a width and/or length dimension of less than 300 μm, in each case one color element is provided, wherein in at least one first zone of the zones of the first color region a thin-film interference filter with at least one interference layer of a first average thickness is provided as color element, wherein the first average thickness is chosen such that in the event of illumination at least one particular angle of observation and/or angle of illumination the thin-film interference filter generates, by means of interference, a color which differs from at least one color which is generated in at least one of the other zones of the first color region by the color element provided there in the event of illumination at this angle of observation and/or angle of illumination.

By the color generated at least one angle of observation and/or angle of illumination is preferably meant here the color generated in direct reflection or direct transmission at this angle of observation or angle of illumination, i.e. in particular the case is meant that the angle of observation is identical to the angle of illumination. The colors produced by means of interference are thus the colors to be seen in direct reflection or transmission. Direct reflection or transmission is sometimes also called zero diffraction order. Furthermore the angle of observation, and also the angle of illumination, is the same for all zones.

For the human observer, at a usual observation distance on the basis of the width and/or length dimension of the zones, the colors generated in the first zone and in the at least one other zone of the first color region are superimposed, with the result that the human observer perceives a mixed color as the color of the color region. Through this mixed color effect, the color region displays to the human observer in the event of illumination novel color-change effects dependent on the angle of observation and/or angle of illumination which can only be imitated with difficulty by other technologies and are thus suitable in particular as security features for the security of value documents or for product assurance.

Advantageous developments of the invention are described in the dependent claims.

By color is meant an individual visual perception which is brought about by light which lies in the range that is visible to the human eye. This perception is also called color perception or color impression. The colors visible to humans lie in the range between 380 nm and 780 nm of the electromagnetic spectrum.

Color is what is perceived, it forms due to the visual stimulus in color receptors in response to a color stimulus specification. Color is not the property of the light seen (color stimulus), it is the subjective sensing of the physical cause of the electromagnetic waves. Corresponding to the spectral color stimulus specification (different intensities in the light), different color stimuli are brought about which form different qualities of the color perception, with the result that different colors are consequently perceived.

A spectral color is the color impression that forms due to monochromatic light in the visible part of the light spectrum. It is the most intense, therefore pure, color in each color shade. Examples of spectral colors are a monochromatic laser with the wavelength 473 nm in the case of blue, with the wavelength 532 nm in the case of green and with the wavelength 635 nm in the case of red.

By a color element is meant an element that generates a color, in particular an area of a colored varnish layer or a thin-film interference filter.

According to a preferred embodiment example of the invention a thin-film interference layer is provided, in particular as a color element, in at least one second zone of the zones of the first color region, wherein in the second zone the interference layer of the thin-film interference filter has a second average thickness which differs from the first average thickness. In this embodiment of the invention particularly interesting and striking color shift effects dependent on the angle of observation and/or illumination are generated by additive color mixing of two or more thin-film interference filters with different thickness of the interference layer. Because the observer perceives the result of an additive color mixing of two or more color shift effects dependent on the angle of observation and/or illumination, extremely complex color gradients dependent on the angle of observation or illumination can be realized which display to the observer surprising effects which can be imitated only with great difficulty—if at all—with other technologies. Such optically variable elements are thereby characterized by a high degree of protection against forgery, furthermore also on the basis of the physical parameters of the optically variable element which can be determined only with difficulty due to the complexity of the optical effects being displayed, and the high outlay on manufacturing technology which is necessary for the production of such an optically variable element.

A first color region here can have, not only two different types of zones, i.e. first zones and second zones, but also three or more different types of zones. Thus it is furthermore also advantageous that a thin-film interference filter is provided in at least one third zone and/or at least one fourth zone of the zones of the first color region, wherein the interference layer of the thin-film interference filter has a third or fourth average thickness respectively in the third or fourth zone and the third and fourth average thicknesses differ from the first and second average thicknesses. Thus a first color region can have, not only two different types of zones, i.e. one or more first and one or more second zones, but also three different types of zones, i.e. one or more first zones, one or more second zones, and one or more third zones, or four different types of zones, i.e. one or more first zones, one or more second zones, one or more third zones, and one or more fourth zones. The different types of zones here are characterized in each case by a different average thickness of the interference layer of the thin-film interference filter. Preferably, the average thicknesses, i.e. the first, second, third and/or fourth average thicknesses, differ from each other in each case by between 20 nm and 500 nm, further preferably between 40 and 400 nm and in particular preferably between 40 nm and 200 nm.

By average thickness of an interference layer in a zone is meant here the thickness of the interference layer averaged over the surface area of the zone.

The average thickness of the first, second, third and/or fourth zones is preferably chosen such that the corresponding optical thickness for a particular angle of observation in reflection meets the λ/2 or λ/4 condition for a wavelength λ in the range of the spectrum visible to the human eye.

Preferably, the first, second, third and/or fourth average physical thickness of the interference layer is between 30 nm and 2000 nm, in particular between 50 nm and 1000 nm, further preferably between 50 nm and 700 nm and still further preferably between 50 nm and 500 nm. If the thin-film interference filter is formed by an individual interference layer, preferably by an HRI layer (HRI=High Refraction Index), then the first, second, third and/or fourth average thickness is preferably selected from the range between 50 nm and 500 nm, in particular 70 nm to 400 nm, further preferably between 70 nm and 250 nm.

The thin-film interference filter is preferably formed by a layer system with three layers, an absorption layer, a spacer layer acting as interference layer and a reflective layer. The interference layer here consists of a material that is at least partially transparent in the visible spectral range, for example $MgF_2$, $SiO_2$ or a polymer. Preferably, the interference layer or spacer layer consists of a printed organic layer, in particular of a polymer layer or varnish layer. The semi-transparent or translucent absorber layer preferably consists of a thin metal layer, for example of chromium, titanium or nickel. The layer thickness of the absorber layer is preferably between 2 nm and 20 nm, in particular 3 nm to 15 nm, further preferably between 3 nm and 10 nm. The reflective layer preferably consists of a metal, for example aluminum. However, it is also possible to use an at least partially transparent layer as reflective layer. Either this can be a very thin metal layer, analogously to the absorber layer, or alternatively this partially transparent layer can be a layer with a refractive index which differs from the refractive index of the interference layer by at least 0.2 and preferably by at least 0.5 and thus likewise makes possible a reflection of the incident light at the top side and bottom side of the interference layer.

Furthermore, it is also possible that the thin-film interference filter consists of a single layer, the interference layer, which has a higher refractive index than the media lying on both sides of it. Preferably, the interference layer in this case consists of titanium dioxide ($TiO_2$) or zinc sulfide (ZnS). The interference layer here is preferably embedded between two polymer layers with a lower refractive index relative to the interference layer, for example embedded between a polymer film and an adhesive layer. Furthermore, such an interference layer can also be formed by a polymer layer (for example with a refractive index of approx. 1.5) which is arranged between two porous, air-filled, and thus low refractive index, layers. Porous, low refractive index layers can be produced here e.g. by means of curtain and cascade coating with track speeds of up to 500 m/min. In respect of the production of such layers, reference is made to WO 2008/011919 A1.

Furthermore, it is also possible that the thin-film interference filter is formed by a layer system which is formed a sequence of low (L) and high (H) refractive index layers, for example is formed by a sequence of three or five such layers. The layers alternate here preferably according to $H(LH)^n$ or $L(HL)^n$. In particular $ZrO_2/SiO_2$ and $ZnS/MgF_2$ are suitable as a material combination for such layer systems. Preferably, two or more layers of such a layer system are formed as interference layers here, which generate interference color effects in reflection and transmission because of their layer thickness—as described above.

The above-described thin-film interference filters are characterized in particular in that in the event of illumination they generate a color dependent on the angle of observation and/or angle of illumination which is at least co-determined by the occurrence of constructive/destructive interference of the light reflected at the top side and back side of the interference layer. Here—unlike first- or higher-order diffraction effects—the angle of illumination is identical to the angle of observation. Constructive interference in an interference layer with a refractive index n and a thickness d is calculated as follows:

$$2nd\ \cos(\theta)=m\lambda,$$

wherein 2×θ is the angle between the direction of illumination and the direction of observation, λ is the wavelength of the light and m is an integer. The angle θ is the angle between surface normal and direction of illumination or direction of observation.

A possibility for enlarging the angle range in which the color effect of the thin-film interference filter can be seen is to integrate matte structures or scattering structures into the optically variable element. These structures can lie for example in the surface of the optically variable element or in one or more of the boundary surfaces between the individual layers of the thin-film interference filter.

According to a preferred embodiment example of the invention, the optically variable element has a layer system which forms the thin-film interference filters provided in the first, second, third and/or fourth zones. This layer system here has at least one layer which forms the interference layer of the respective thin-film interference filter in each case in the first, second, third and/or fourth zones. This common interference layer has the first, second, third and fourth average thickness in the first, second, third and/or fourth zones respectively. Thus, in the optically variable element, a layer system is preferably provided which provides the thin-film interference filters provided in the zones of the color regions by varying the layer thickness of this layer within the first area in such a way that in the area of the respective zones it has the average thickness corresponding to the average thickness of the interference layer of this zone. Preferably, the layers of this layer system are provided over the whole surface in the first area in the optically variable element. If the thin-film interference filters of the zones are thus formed for example by the above-described three-layered thin-film interference filter, then the layer system has an absorber layer, a spacer layer forming the interference layer of the thin-film interference filter and a reflective layer. The thickness of the spacer layer is varied in the first area such that in the zones of the first color regions the spacer layer has an average thickness corresponding for example to the first, second, third and/or fourth average thickness.

Preferably, the spacer layer is produced in this way with a targeted and controlled variation of the layer thickness. Here this variation is preferably achieved by means of a lateral structuring of a first boundary surface of an interference layer (spacer layer), common to a plurality of zones, below the resolution limit of the human eye.

The second boundary surface of the interference layer opposite the first boundary surface is preferably smoothed down and preferably formed almost smooth.

Thus, for two or more zones of the first color regions a common interference layer with a first surface and a second surface opposite this is provided in the optically variable element, wherein the second surface is shaped substantially flat and a surface relief is molded into the first surface, with the result that in the zones the interference layer is shaped in the corresponding average thickness. Substantially flat here means that the maximum elevation of the second boundary surface in the respective zone corresponds to less than 70%, preferably less than 50%, particularly preferably less than 30% of the relief depth of the surface relief in this zone and/or is smaller than 300 nm, in particular smaller than 200 nm, particularly preferably smaller than 100 nm.

According to a preferred embodiment example of the invention, for this the process during the production of the optically variable element is as follows:

Molded into a surface of a substrate is a surface relief, the relief depth of which in the first zone differs from the relief depth in the at least one other zone of the first color region. The surface relief thus has a first relief depth in the first zones of the first color regions and a second, third or fourth relief depth respectively in the optionally provided second, third and/or fourth zones of the first color regions.

The surface of the substrate is optionally coated with an absorber layer or reflective layer. The material of the interference layer is then applied in liquid form, in particular by means of a printing process, for example applied by means of gravure printing. The layer thickness in which the material of the interference layer is applied is preferably chosen here such that this layer thickness is greater than the depressions of the surface relief, and thus is preferably chosen greater than the first, second, third and/or fourth relief depth.

The material of the interference layer applied in liquid form deliquesces—depending on the chosen viscosity—before it cures, whereby a different layer thickness of the interference layer forms depending on the respective relief depth of the surface relief. This smoothing effect can be further strengthened by the choice of highly viscous materials for the interference layer. Furthermore, the smoothing effect is strengthened by the choice of solvents that evaporate slowly, as the material of the interference layer hereby has more time to flow into the depressions in such a way that the second boundary surface is more strongly smoothed down.

It has further proved to be particularly advantageous to additionally smooth down the interference layer after application again for example by solvent evaporation and/or tempering. The rounding off and smoothing down of surfaces is known in microstructuring technology under the term "reflow".

It has proved to be particularly advantageous to design the surface relief such that the thickness of the interference layer averaged over all zones of the color regions, i.e. the sum of the layer thicknesses of all zones of a color region planned for a desired color effect divided by the number of the zones, is identical or almost identical for all color regions. This is preferably achieved by the insertion of sunk zones.

The sunk zones preferably have a much greater relief depth compared with the previously described first and further color-generating zones. This is preferably chosen such that the thickness of the interference layer or the average thickness of the interference layer in the area of the sunk zones lies between 500 nm and 5000 nm, preferably between 700 nm and 2000 nm. It is hereby achieved that the optical appearance of the desired motif is not, or is only slightly, impaired by the sunk zones. This is due to the fact that a thin-film interference filter with an interference layer with this thickness appears dark reddish, dark greenish or dark gray.

The sunk zones are now inserted into the color regions in such a number and in such surface dimensions that the average layer thickness of the interference layer for example of two neighboring color regions or also all color regions is as identical as possible or almost identical, preferably the average layer thickness of the interference layer deviates from each other in these color regions by not more than 10%, preferably by not more than 5% and in particular not more than 2%. For this, in a first step the zones to be chosen to achieve the desired optical effect in the color areas and the average thickness of the interference layer in these zones are determined. Then the thus resultant thickness of the interference layer averaged over the whole respective color region is determined in the respective color regions. Sunk zones of a corresponding interference layer thickness, number and surface area are then provided in one or more of the color regions, with the result that the differences between the thicknesses of the interference layers of the color regions averaged over the respective color regions are balanced out. For this, for example the difference in the layer thickness of the interference layer averaged over the respective color regions is determined for neighboring color regions and in the color region which has a smaller averaged interference layer thickness one or more sunk zones are provided, the number and surface dimensions of which are chosen such that this difference is balanced out or balanced out as much as possible.

Preferably, the surface proportion of the sunk zones in each of the color regions here is less than 50%, further preferably less than 30%, in particular less than 20% and in particular preferably less than 10%.

By the insertion of the sunk zones it is achieved that the material of the interference layer applied in liquid form can be distributed particularly uniformly and thus the color sharpness is further improved. In particular it is achieved that all color pixels of one kind have the same thickness of the interference layer in all color regions.

According to a further preferred embodiment of the invention the procedure for the production of the interference layer common to two or more zones is as follows: Material of the interference layer is first applied to a largely flat substrate. Then a surface relief is molded into the interference layer, in particular molded by means of thermal replication or UV replication. The variation in the thickness of the interference layer is thus brought about directly by correspondingly embossing a surface relief into the interference layer, whereby the thickness of the interference layer can be set particularly precisely. Particularly clear color effects can be achieved hereby. It is advantageous if the procedure during the molding of the surface relief into the interference layer is such that this surface relief is not, or is only weakly, printed through or embossed through into the second boundary surface of the interference layer. If the above-described layer system with three layers is used as interference layer filter, then preferably either the absorber layer or the reflective layer is applied to the substrate before the application of the material of the interference layer, and after the replication of the surface relief into the interference layer this is coated with the reflective layer or absorber layer.

Furthermore, it is also possible that the thin-film interference filters in the individual zones of the first color regions are not formed by a common layer system, but by in each case separately applied layer systems which can also be formed in each case of a different number of layers or different materials.

According to a preferred embodiment example of the invention, in addition to one or more first zones, one or more further zones which generate a color, not by means of a thin-film interference filter, but on the basis of another physical principle, and in particular provide a corresponding color element are also provided in a first color region.

Preferably, such further regions have a dye and/or a pigment which in the event of illumination at the particular angle of observation and/or angle of illumination generate a color which differs from the first color generated in the at least one first zone in the event of illumination at the particular angle of observation and/or angle of illumination. A first color region here can also have several such zones which differ from each other in each case in terms of their color. A first color region can thus have for example one or more fifth zones, one or more sixth zones and/or one or more seventh zones which have a colored varnish layer with a dye or a pigment which in the event of illumination at the particular angle of observation and/or angle of illumination generates a fifth, sixth or seventh color, which colors differ from the colors generated in the at least one first zone at the particular angle of observation and/or angle of illumination and also differ from each other.

This additional embodiment can furthermore also be combined with the above-described embodiments, with the result that a first color region can have for example one or more first zones, one or more second zones, one or more third zones, one or more fourth zones, one or more fifth zones and/or one or more sixth zones. By combining such different zones in a first color region, very interesting mixed color effects, by which the protection against forgery of the optically variable element is still further increased, can be generated in the first color region.

According to a preferred embodiment example of the invention a plurality of color regions which are arranged according to a one- or two-dimensional grid and form in each case an image spot of a first motif are provided in the first area.

Preferably, more than 10%, in particular more than 50%, preferably more than 70%, further preferably more than 90% of these color regions are here formed by first color regions. The first color regions here preferably vary in terms of the combination of zones which are provided in them. Thus it is possible for example that some first color regions have a combination of first and second zones and the other first color regions have a combination of first, fifth and sixth zones, further first color regions have a combination of first, second, third, fourth and fifth zones etc. Furthermore it is also possible that two first zones of the first color regions differ in terms of the average layer thickness of the interference layer, i.e. the designation first zone, second zone, third zone and fourth zone preferably refers, not to a particular average layer thickness of the respective interference layer, but to the fact that the respective color region has one, two, three or four thin-film interference filters with thicknesses of the interference layer that differ from each other.

The color regions of the first area can furthermore be formed, not only by first color regions, but also by second color regions, which are not formed like the first color regions. In the simplest case, the second color regions can be formed by areas of a colored varnish layer or by a single thin-film interference filter. Preferably, the second color regions are not determined by color mixtures of colors generated in two or more zones of the color region and/or their color is independent of the angle of observation and/or angle of illumination. Interesting contrasts within the optically variable appearance of the first motif can be generated hereby.

Preferably, each of the color regions has a width and/or length of less than 300 µm, preferably between 300 µm and 15 µm, furthermore between 300 µm and 30 µm, further preferably between 200 µm and 30 µm and in particular between 200 µm and 50 µm.

Preferably, each zone of the first color regions has a width and/or length of between 300 µm and 3 µm, furthermore between 300 µm and 5 µm, further between 150 µm and 5 µm, in particular between 150 µm and 10 µm, further between 80 µm and 10 µm, preferably between 80 µm and 20 µm.

According to a preferred embodiment example of the invention the surface proportion of the respective first color region which is covered by first, second, third, fourth, fifth, sixth and/or seventh zones is varied to set the color value and the brightness of the respective image spot (in the respective direction of observation) in the first area.

It is further advantageous to provide two or more first, second, third, fourth, fifth, sixth and/or seventh zones in first color regions. Further, it is also advantageous here not to increase the area size of the respective zone, but to increase the number of the respective zones of the same type in order to increase the surface proportion of the respective zones in the respective first color regions. Tests have shown that disruptive effects which impair the color mixing can hereby be largely avoided. It is further advantageous to arrange the zones in a pseudorandom arrangement in the first color regions and/or to vary the arrangement of the zones in the first color regions. Disruptive effects, for example by diffraction and/or moiré-like effects, can hereby be further reduced. It is particularly preferred here to provide two or more first and two or more second zones in at least two of the first color regions and to arrange these two or more first and two or more second zones in a pseudorandom arrangement in these color regions and/or to choose the arrangement of the first and second zones in these color regions such that they differ.

According to a preferred embodiment example of the invention the first, second, third and/or fourth average thickness of the first color regions is chosen in the first area such that it is constant. It is hereby possible to provide in the first area a common interference layer, the layer thickness of which in the individual zones is selected from a common group of for example two, three or four layer thicknesses. The production of the optically variable element is hereby simplified.

However, it is also possible that the first, second, third and/or fourth average thicknesses of a first group of first color regions differ from the first, second, third and/or fourth average thicknesses of a second group of first color regions. This can be utilized, for one thing, in order that the illumination-/observation-dependent variation of the color in the first group and the second group differs correspondingly through the different color mixing, whereby for example movement effects etc. can be generated. Furthermore, it is also possible that the average thicknesses of the first group and of the second group are selected such that in one or more directions of illumination and/or observation one or more of the first color regions of the first group and of the second group generate metameric colors in the event of illumination. It can hereby be brought about for example that in particular directions of observation details or areas of the motif disappear and only become visible in particular directions of observation.

According to a further preferred embodiment example of the invention a plurality of color regions which are arranged according to a one- or two-dimensional grid and which form in each case an image spot of a second motif are provided in a second area. The second motif here can be formed identical to or different from the first motif in respect of its shape. Furthermore, it is also possible that the first and second motifs form motifs that supplement each other. Here too, preferably more than 10%, in particular more than 50%, further preferably more than 70% and further preferably more than 90% of the color regions in the second area are formed by first color regions. Furthermore, the second area can also have color regions which differ from first color regions, for example the above-described second color regions.

Preferably, the first, second, third and/or fourth average thicknesses of the first color regions of the first area here differ from the first, second, third and/or fourth average thicknesses of the first color regions of the second area. It is hereby brought about that the optically variable appearance of the first motif and of the second motif differs correspondingly, which provides an additional security feature. Advantageously, the average thicknesses identified above differ here in such a way that in one or more directions of illumination and/or observation one or more of the color regions of the first area and of the second area generate metameric colors in the event of illumination. In one or more directions of illumination and/or observation, for example, the first and second motifs thus appear in a similar or identical coloring, but in the event of tilting correspondingly different color changes are displayed. This can likewise be used as additional security feature.

According to a preferred embodiment example of the invention the optically variable element has a color layer which is arranged underneath the thin-film interference filter. This color layer is preferably dyed dark, in particular black or dark gray, dark green, dark blue or dark red. Furthermore, it is preferred if this color layer has a patterned shaping, for example is shaped in the form of a third motif. Through the use of such a color layer it is possible to strengthen the contrast strength of the thin-film interference filter and for example hereby to personalize and/or alter the image being displayed to the observer by a patterned design of this layer.

Furthermore, it is also possible that the color layer consists of optically variable pigments. In the case of a suitable choice of these pigments, metameric effects can be generated with the color effects of the zones of the security feature.

The optically variable element can be formed for example in the form of a transfer film, a laminating film, a label, a security thread or a security document. In the case of the design as a transfer film, the optically variable element preferably has a carrier film and a decoration layer which is detachable from this and which is optionally also provided with an adhesive layer. In the design as a laminating film, the optically variable element preferably has a carrier film and a decoration layer which is connected to this and which can likewise optionally also be coated with an adhesive layer. The decoration layer here comprises the above-described layers which generate the optically variable effects of the optically variable element. The optically variable element is thus applied to or introduced into a security document or an object to be protected for example in the form of the transfer layer of a transfer film, a part of a laminating film, a label or a security thread. Furthermore it is also possible that the optically variable element is formed by a security document, for example a banknote, an ID document, a credit card or a certificate. Such a security document preferably comprises one or more carrier layers which can also consist of a paper material, and furthermore one or more layers which provide the optical function of the optically variable element according to the invention. It is also possible here that the layers providing the optically variable effect are embedded into the inside of the security document, for example that the security document is formed by a security document in the form of card.

The invention is explained by way of example below with reference to several embodiment examples with the aid of the attached drawings.

FIG. 1b shows a schematic sectional representation of the security document according to FIG. 1a.

FIGS. 2b1 and 2b2 show a schematic representation to illustrate the implementation of an image spot of a motif in a color region.

Figure 2A:
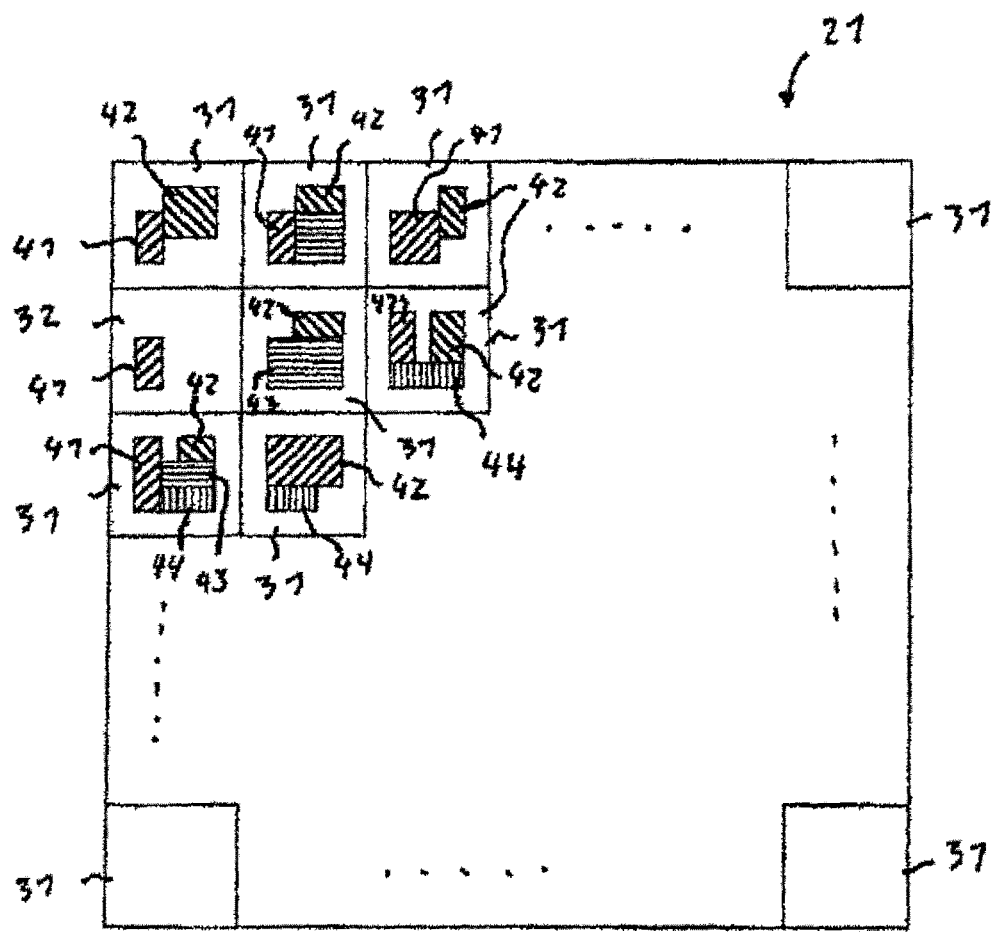
FIG. 2a shows a schematic top view of an area of the optically variable element with a plurality of color regions.
Figure 2C:
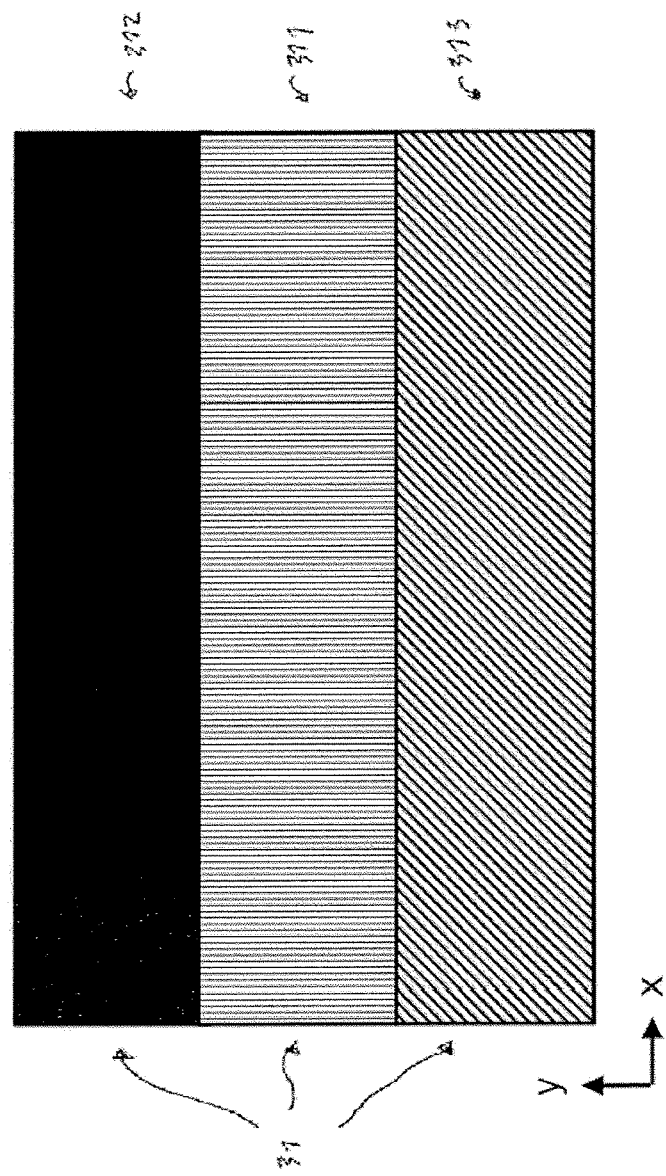
Figure 2D:
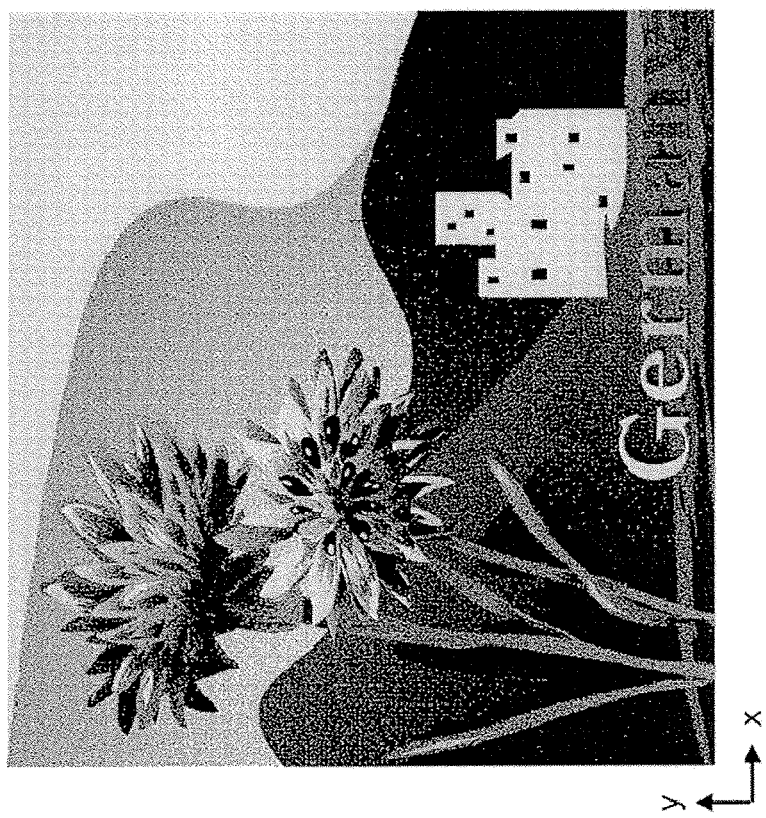
Figure 2E:
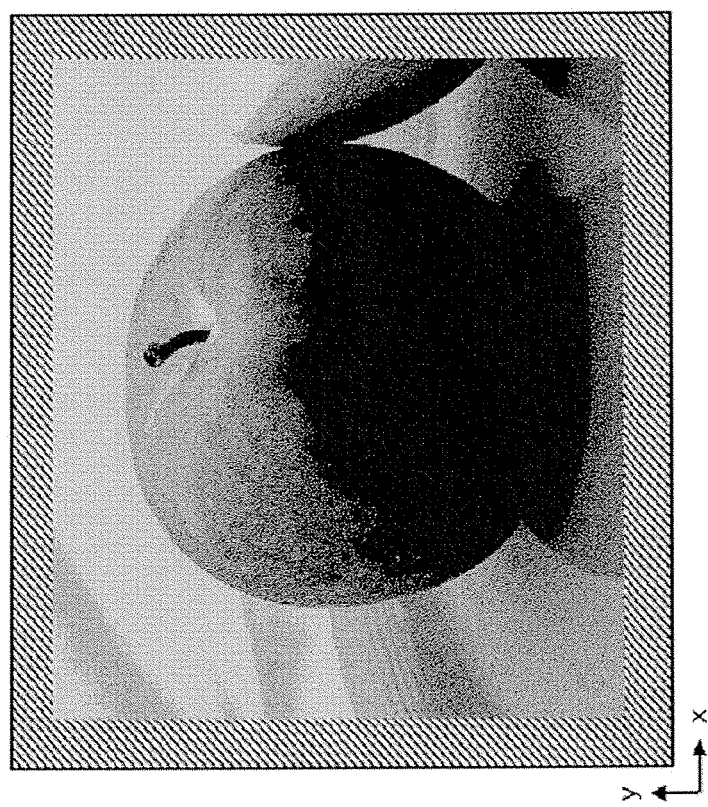

FIG. 2c to FIG. 2e in each case show a schematic top view of a motif represented in an area of an optically variable element.

Figure 3A:
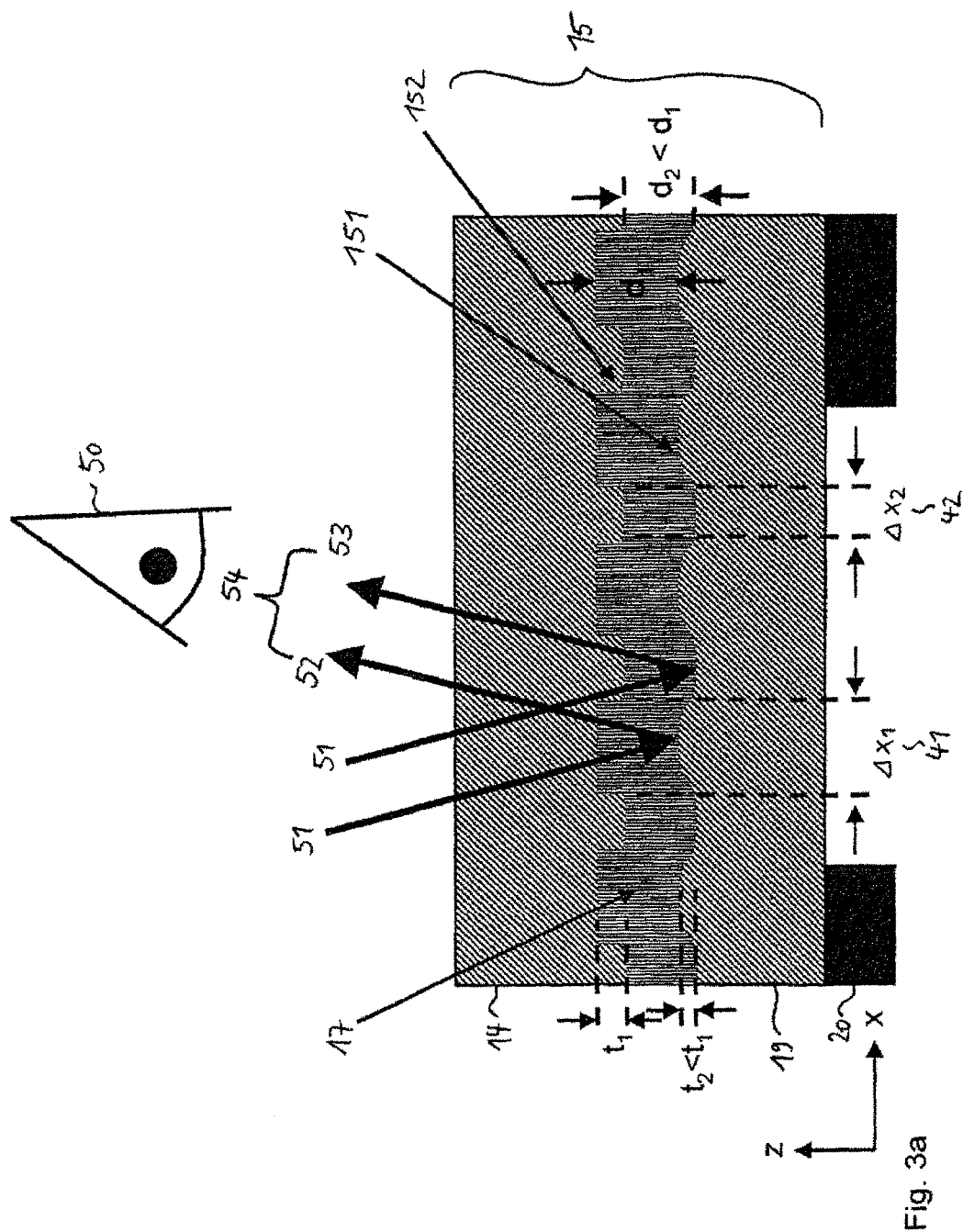

FIG. 3a shows a schematic sectional representation of an optically variable element.

Figure 3B:
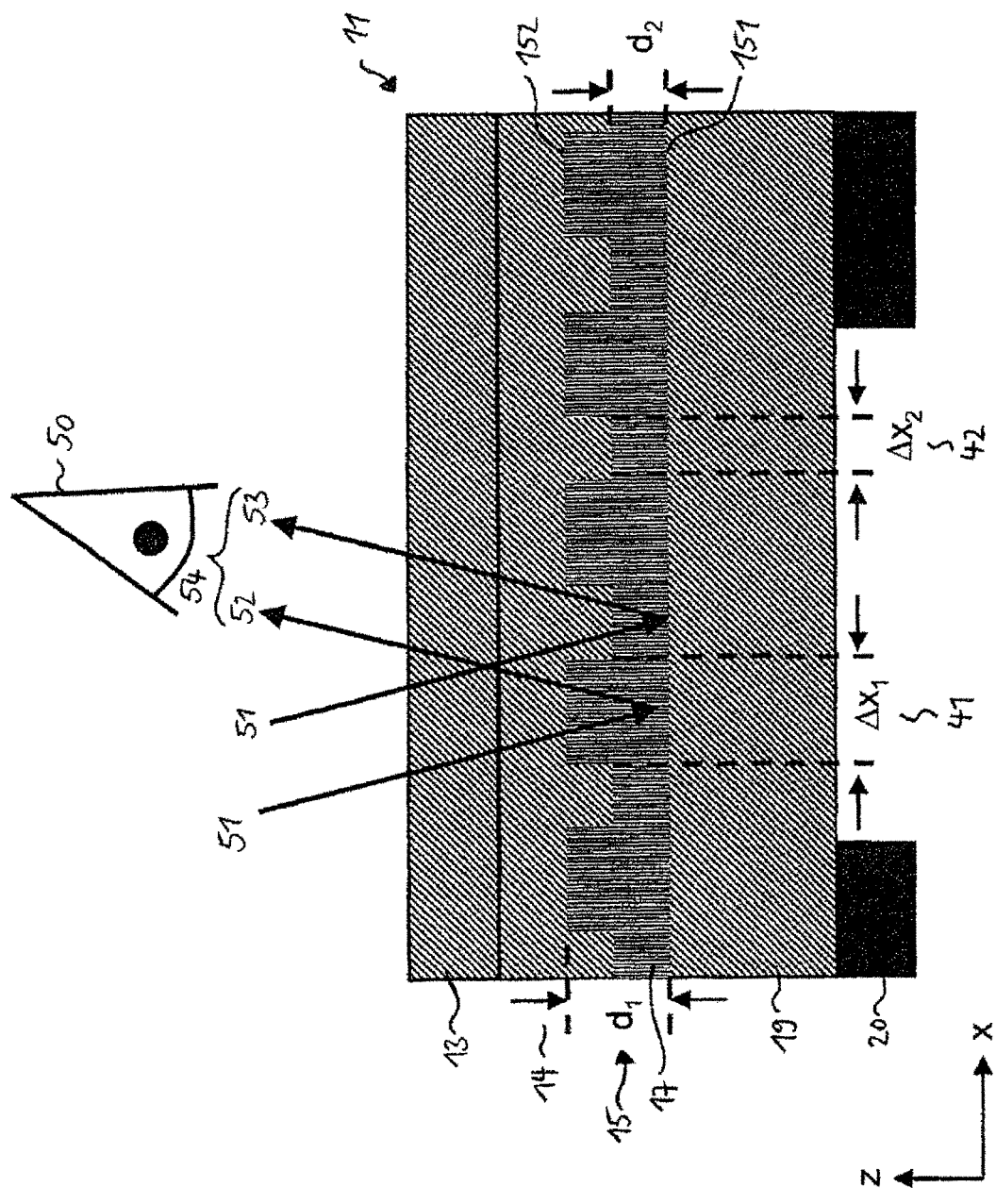

FIG. 3b shows a schematic sectional representation of an optically variable element.

Figure 3C:
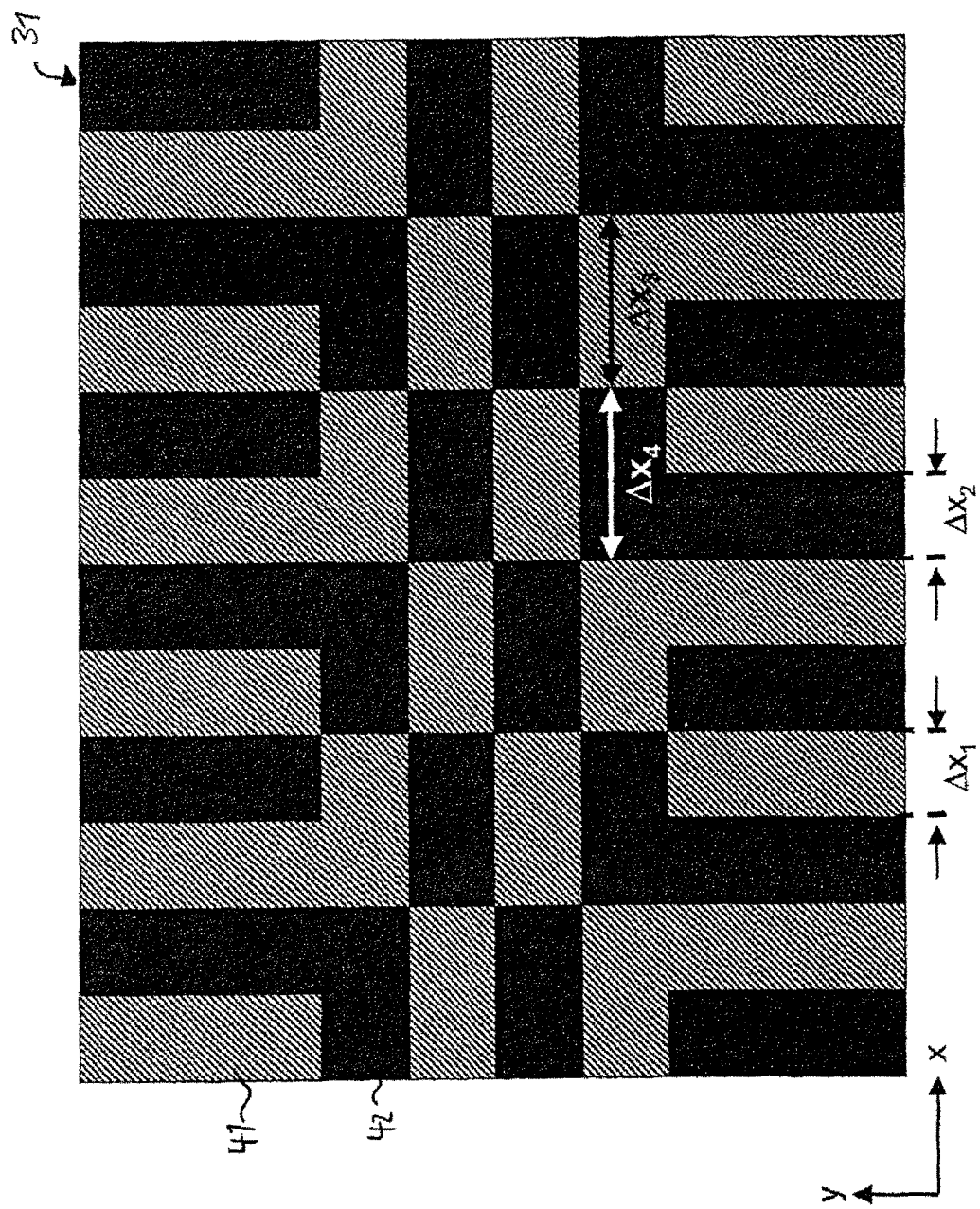
Figure 3A:
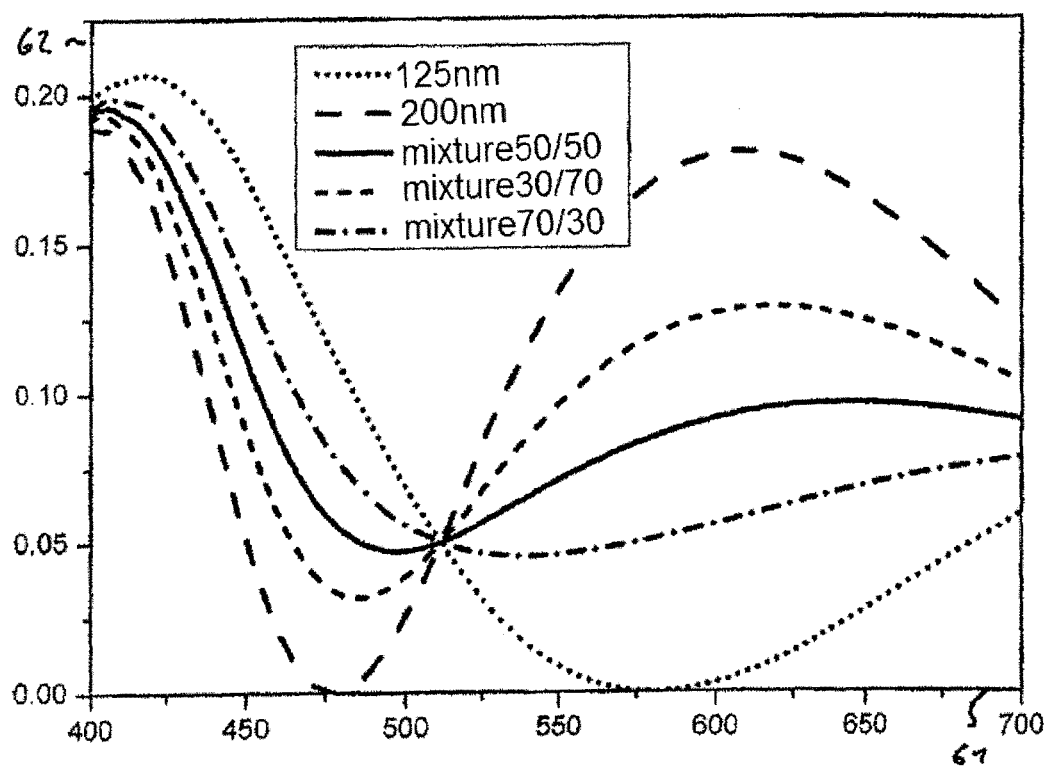

FIG. 3c shows a schematic top view of an area of an optically variable element.

FIG. 3d shows a diagram of the wavelength spectrum being displayed to the observer in a color region.

FIG. 4a to FIG. 4e illustrate the production of an optically variable element with reference to several sectional representations.

Figure 5A:
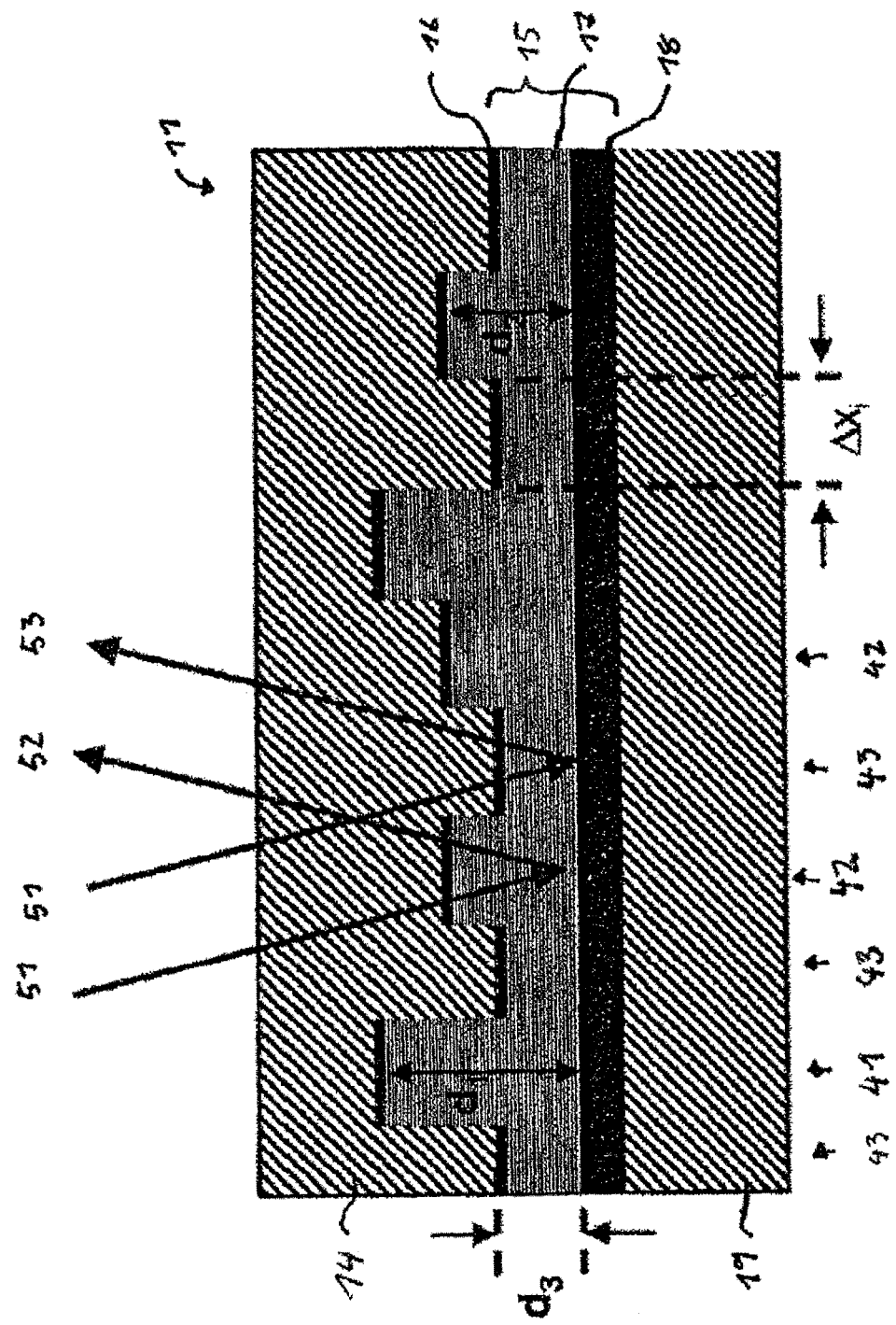

FIG. 5a shows a schematic sectional representation of an optically variable element.

Figure 5B:
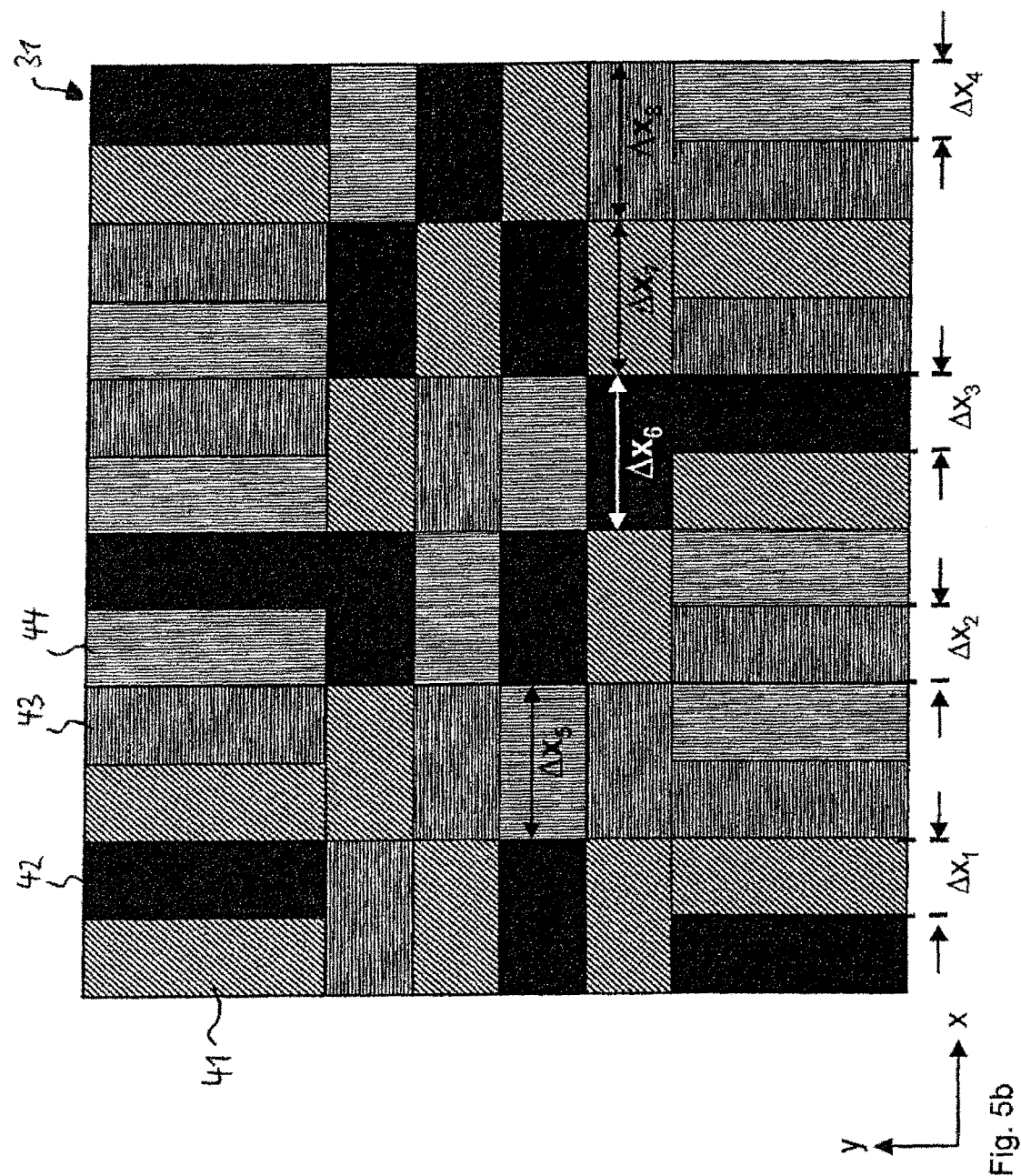

FIG. 5b shows a schematic top view of an optically variable element.

Figure 5C:
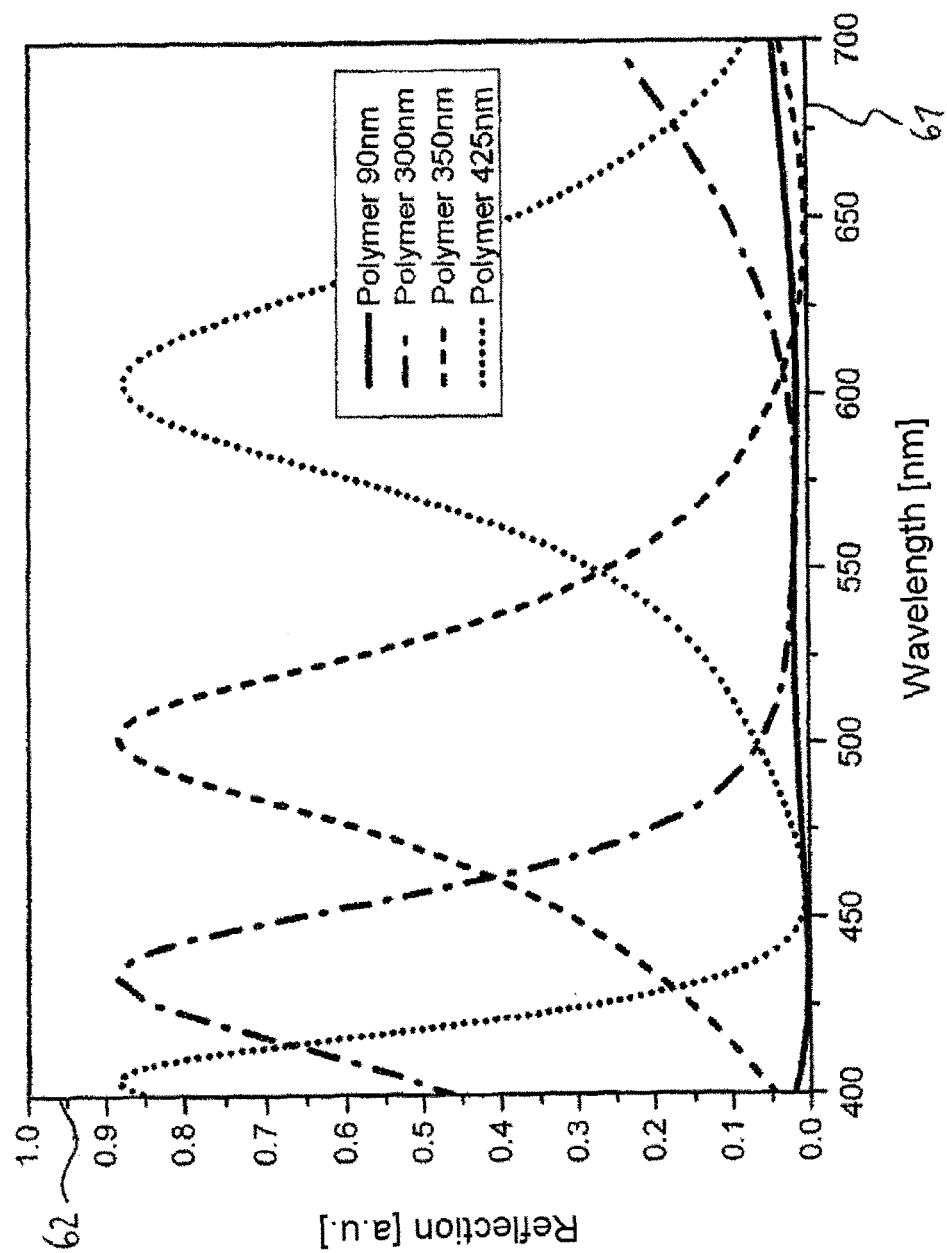

FIG. 5c shows a diagram of the wavelength spectrum being displayed to the observer.

Figure 6A:
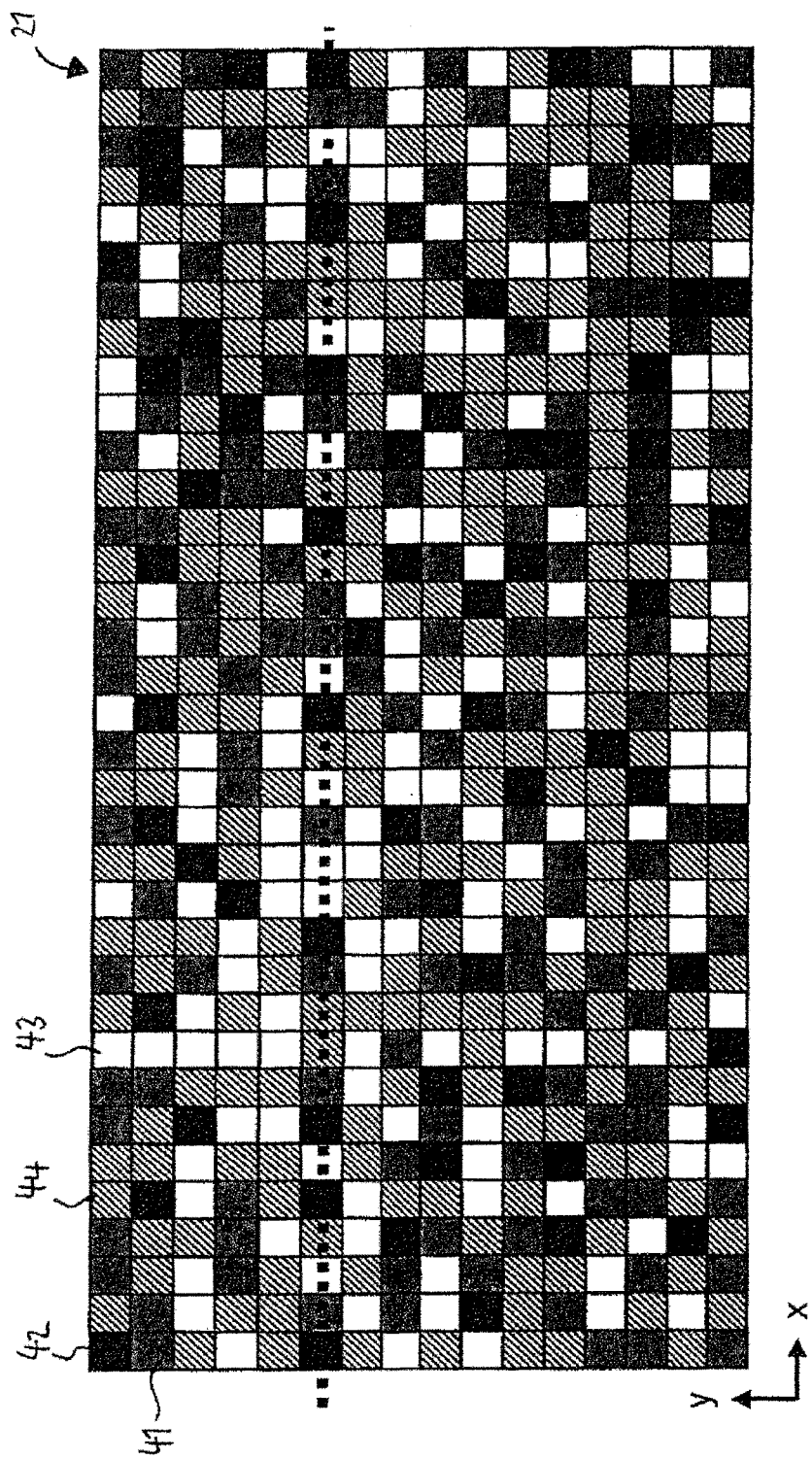

FIG. 6a shows a schematic top view of an optically variable element.

Figure 6B:
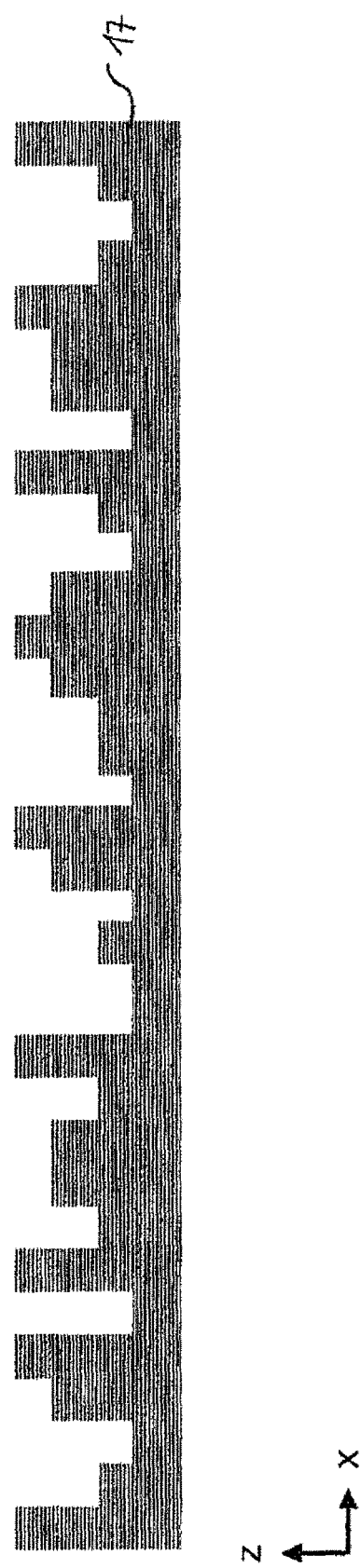

FIG. 6b shows a schematic sectional representation of an interference layer of the optically variable element according to FIG. 6a.

Figure 6C:
Figure 6D:

FIG. 6c and FIG. 6d show representations of an area of an optically variable element which is observed at different angles of observation.

Figure 7A:
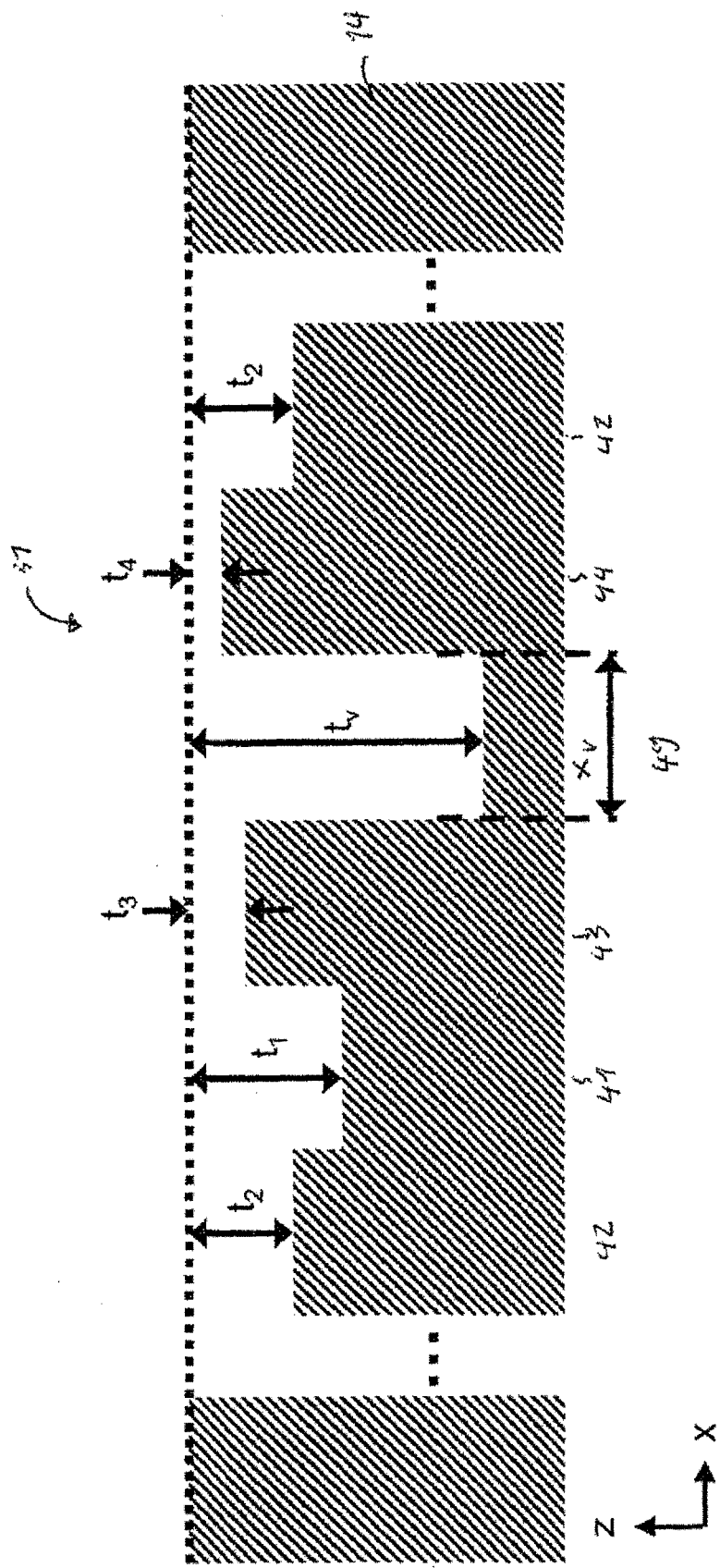
Figure 7B:
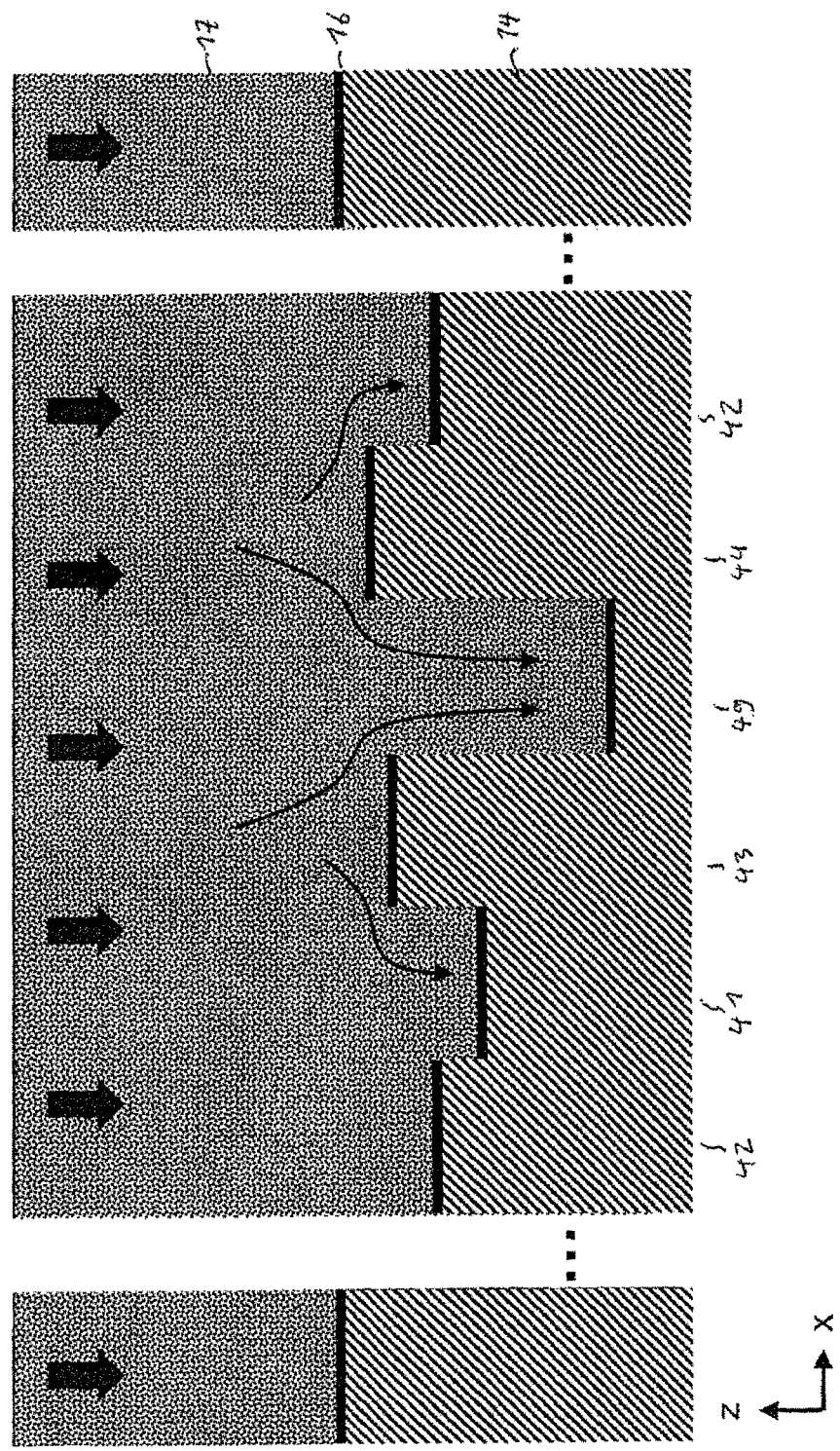
Figure 7C:
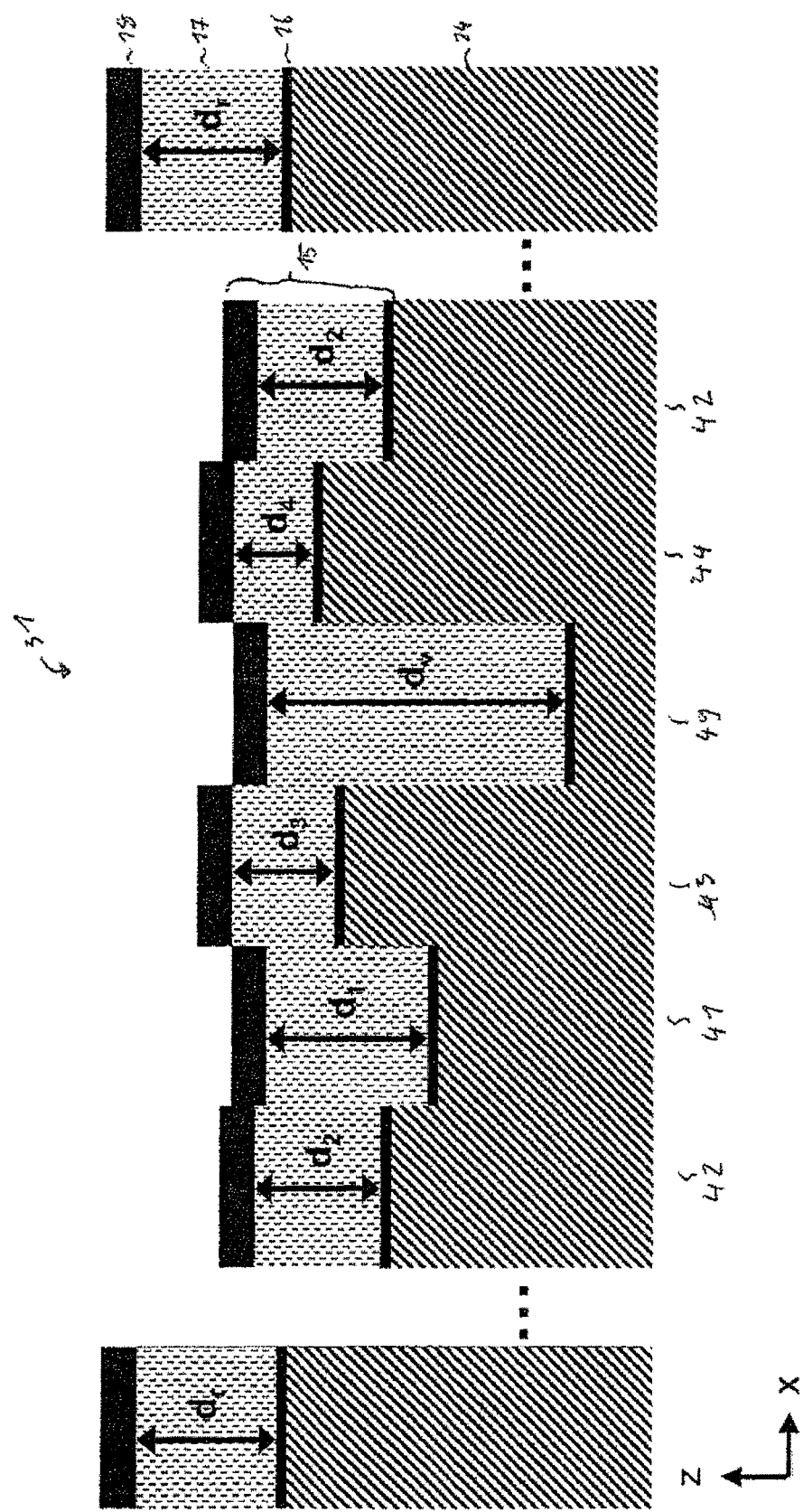

FIG. 7a to FIG. 7c illustrate the production of an optically variable element with reference to several sectional representations.

Figure 8:
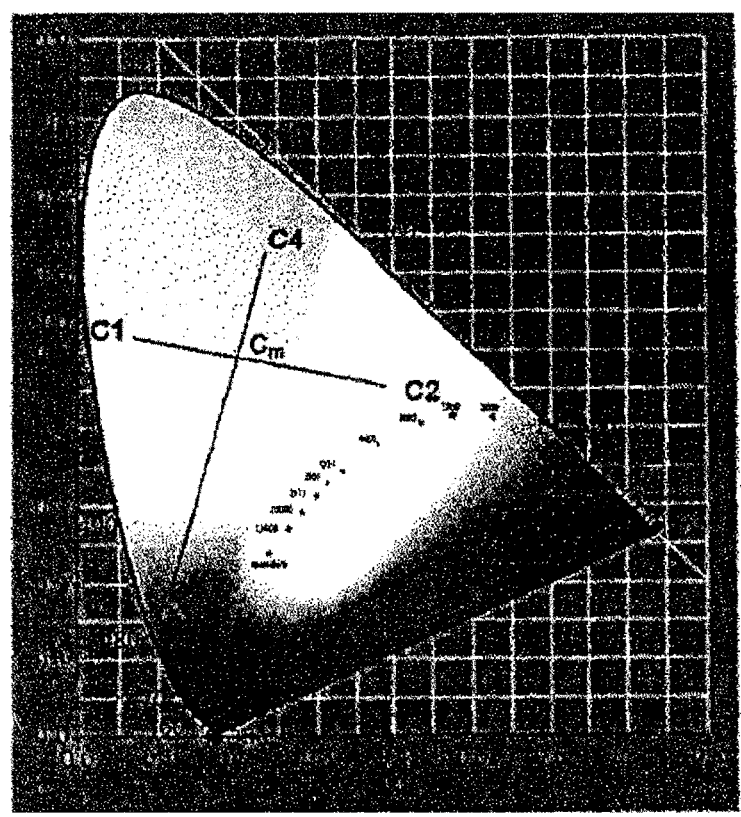

FIG. 8 shows a chromaticity diagram.

FIG. 9 shows a schematic sectional representation of an optically variable element.

Figure 10A:
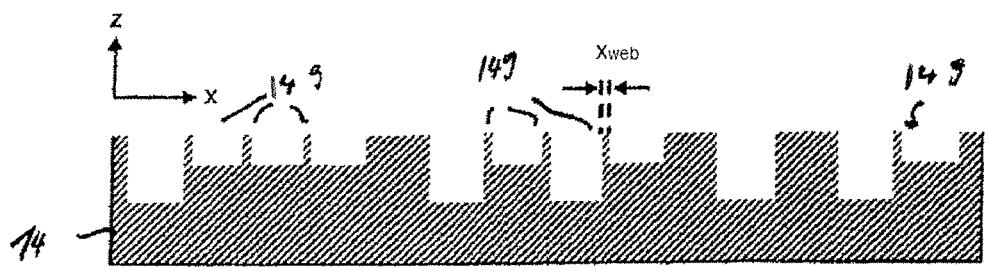
Figure 10B:
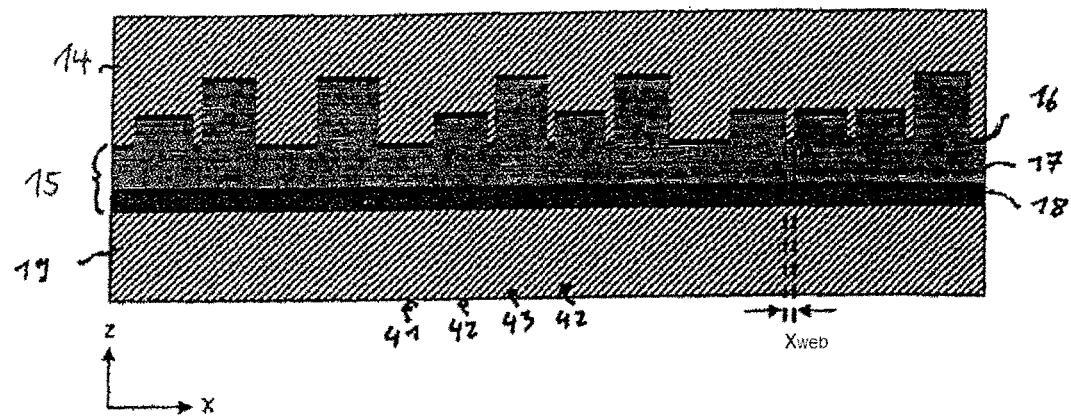

FIG. 10a and FIG. 10b illustrate the production of an optically variable element with reference to sectional representations.

Figure 11A:
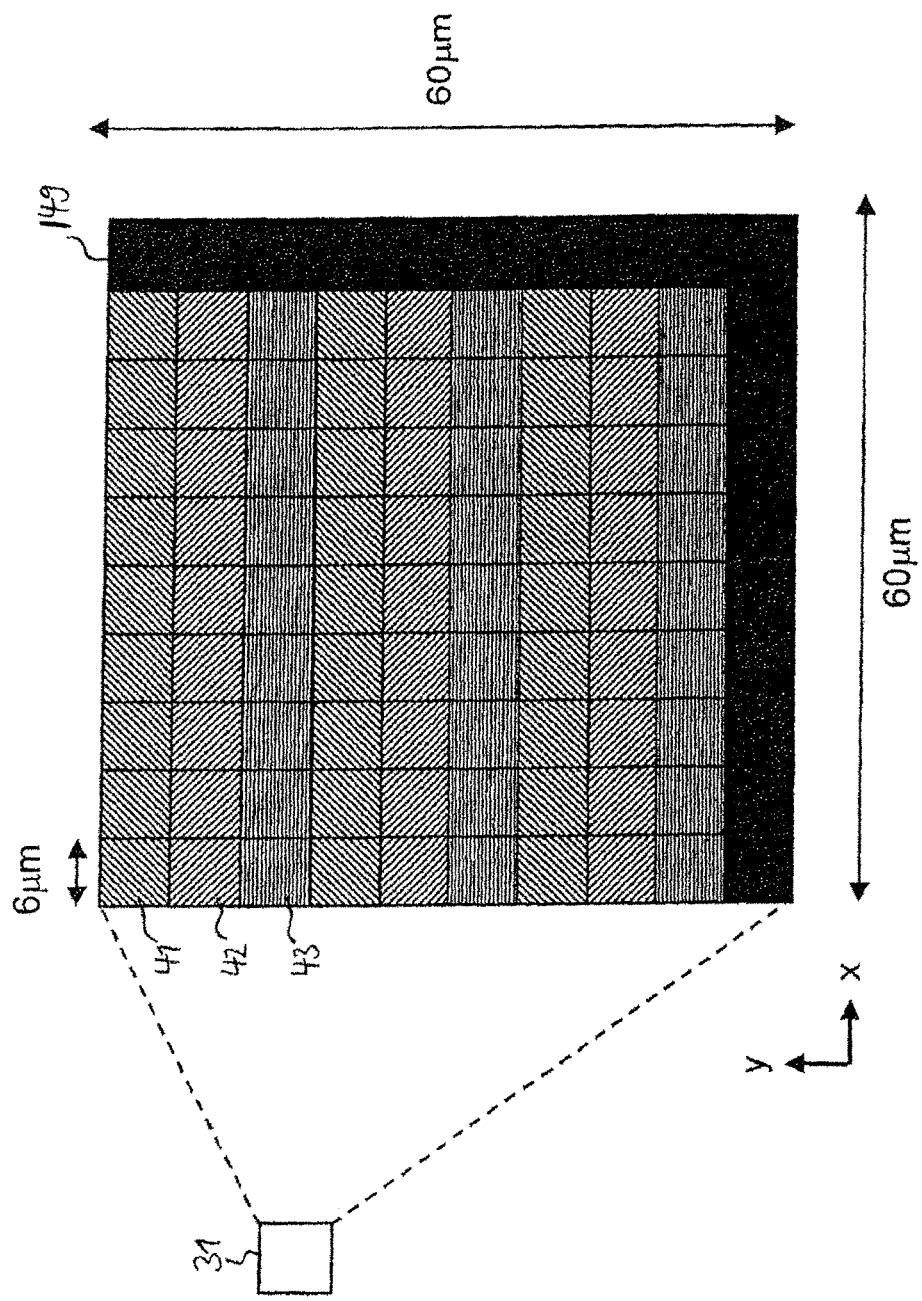

FIG. 11a shows a schematic representation of a color region of an optically variable element.

Figure 11B:
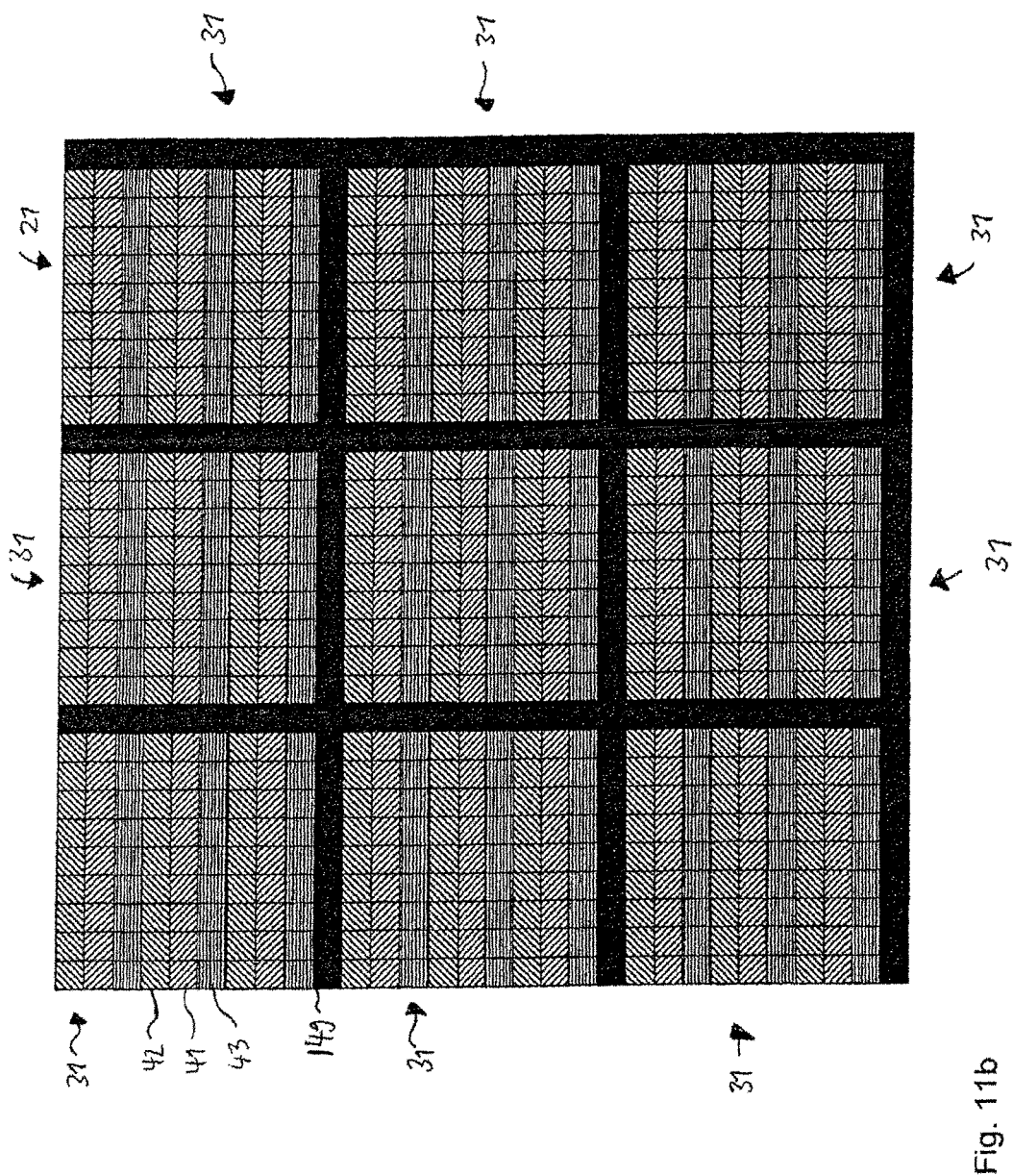

FIG. 11b shows a schematic top view of an area of an optically variable element.

Figure 1A:
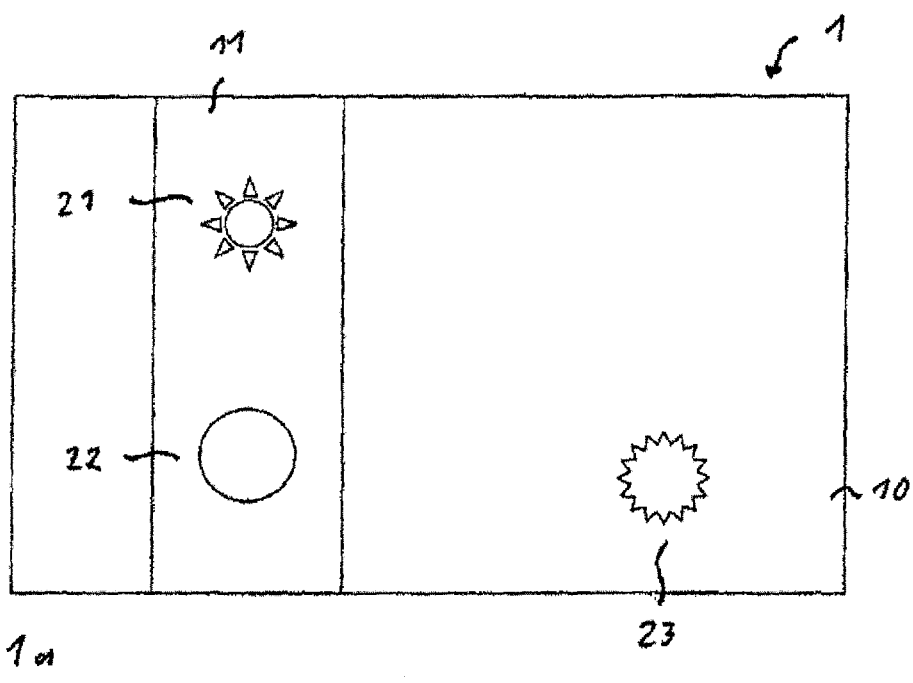
FIG. 1a shows a schematic top view of a security document with an optically variable element.
Figure 1B:
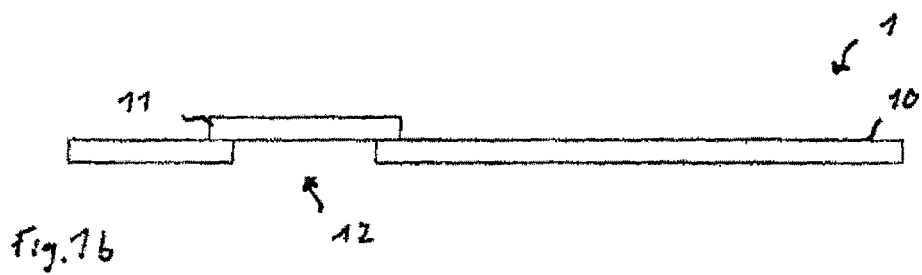

FIG. 1a and FIG. 1b show a security document 1 with an optically variable element 11. The security document 1 is a banknote in the embodiment example shown in FIG. 1a and FIG. 1b.

However, it is also possible that the security document is an ID document, for example an access card or a passport, or a credit card, a phone card, a certificate or the like.

The security document 1 has a carrier substrate 10 to which the optically variable element 11 is applied. The carrier substrate 10 is formed for example by a paper substrate, a plastic substrate or by a multi-layered substrate comprising several paper and plastic layers. Here, security elements, for example watermarks and security threads, can be embedded into the substrate 10. Furthermore it is also possible that still further optically variable security elements are applied to the substrate. Thus, by way of example, an optically variable security element 23 which has a patch-like shaping is shown in FIG. 1a.

The carrier substrate 10 preferably also has one or more recesses 12 or transparent areas which are covered by the optically variable element 11. The advantage is hereby achieved that the optically variable element 11 is visible both from the front and from the back side, and can thus provide corresponding security features when viewed in reflected light from the front side, when viewed in reflected light from the back side and when viewed with light passing through.

The optically variable element 11 is preferably formed as a laminating film, which has a strip-like shaping and extends completely over the transverse side of the security document 1, as is shown in FIG. 1a. The laminating film here has a carrier film and a decoration layer which is fixed by means of an adhesive layer on the carrier substrate 10 of the security document 1. The adhesive layer here can also be a multi-layered adhesive layer. The area of the recess 12 here can likewise be excluded in the adhesive layer or an adhesive which is formed as transparent as possible optically is preferably provided in this area.

Flexible plastic films, for example of PI, PP, MOPP, PE, PPS, PEEK, PEK, PEI, PSU, PAEK, LCP, PEN, PBT, PET, PA, PC, COC, POM, ABS, PVC, preferably come into consideration as carrier films. The carrier film preferably has a thickness of between 5 µm and 700 µm, in particular between 8 µm and 200 µm, particularly preferably between 12 µm and 50 µm.

However, it is furthermore also possible that the optically variable element 11 is formed, not by a laminating film, but by the transfer layer of a transfer film and/or the optically variable element has, not a strip-like, but a patch-like shape.

In an area 21 the optically variable element 11 has a security feature with one or more color regions which in the event of illumination generate a color dependent on the angle of observation and/or angle of illumination. Furthermore, in an area 22 the optically variable element 11 preferably also has one or more further security features which are formed for example by a hologram or a diffractive structure, for example a Kinegram®.

As already stated above, in an embodiment example not shown here the optically variable element 11 can also have the form of a transfer film which has a carrier film, an optional detachment layer, a decoration layer and an optional adhesive layer. The decoration layer of such a transfer film preferably has the layers, described below, of the optically variable element 11, with the result that in this respect reference is made to the statements below. The transfer film can also be used to integrate the optically variable element 11 into an ID document.

As already stated above, the optically variable element 11 can also be formed for example by a label or a security document as such which has a corresponding decoration layer. Also in this respect reference is made to the statements below.

FIG. 2a shows a top view of a preferred embodiment of the optically variable element 11 in the area 21. In the area 21 the optically variable element 11 preferably has a plurality of color regions 31 and 32, as is shown by way of example in FIG. 2a. Preferably, the color regions 31 and 32 are arranged in a one- or two-dimensional grid, as is shown for example in FIGS. 2b1 and 2b2. However, it is also possible that the area 21 only has one color region 31 or only a small number of color regions 31 which also are not arranged in a regular grid.

Each of the color regions 31 has two or more zones arranged next to each other which have in each case a width and/or length dimension of less than 300 µm. Preferably, these zones have a width and/or length of between 300 µm and 5 µm, further between 150 µm and 5 µm, in particular between 150 µm and 10 µm, further between 80 µm and 10 µm, preferably between 80 µm and 20 µm. Several such zones, namely the zones 41, 42, 43 and 44, are shown here in FIG. 2a.

The zones, in particular the zones 41 to 44, preferably have a rectangular, square or circular shape. However, it is also possible that the zones have any other shape and for example have a triangular, a pentagonal, oval or also an L-shaped shape.

By width and width dimension is meant here the minimum of the spacing between two opposite boundary lines of the zone. By length and length dimension is meant here the maximum of the spacing between two opposite boundary lines of the zone.

In the color regions 31, in at least one of the zones, a thin-film interference filter is provided, the interference layer of which has an average thickness which is chosen such that in the event of illumination at least one particular angle of observation and/or angle of illumination the thin-film interference filter generates, by means of interference, a first color which differs from at least one color which is generated in the event of illumination at this angle of observation and/or angle of illumination in at least one of the other zones of the color region 31. The color regions 31 thus have a combination of two or more zones which generate different colors in the event of illumination in a particular angle of observation and/or illumination.

In the embodiment example according to FIG. 2a the zones 41 have in each case a thin-film interference filter, the average thickness of which in the zone 41 is chosen such that in the event of illumination at a particular angle of observation and/or angle of illumination the thin-film interference filter generates, by means of interference, a first color. In the event of illumination at this angle of illumination and/or observation the zones 42 generate a second color, the zones 43 generate a third color and the zones 44 generate a fourth color. The first, second, third and fourth colors here differ from each other and are selected for example from the group red, green, blue and black. The zones 42 to 44 here can likewise have a thin-film interference filter which generates the second, third or fourth color by means of interference, wherein here the average thickness of the interference layer of the thin-film interference filter is then chosen correspondingly differently to the thickness of the interference layer of the thin-film interference filter of the zone 41. Furthermore, it is also possible that one or more of the zones 42 to 44 do not generate the second, third or fourth color by means of a thin-film interference filter, but for example in these zones a colored varnish layer is provided with a dye or a pigment which generates the corresponding color in the event of illumination.

Furthermore it is also possible that in the color regions 31 still further zones are provided which at the particular angle of observation and/or illumination generate further colors which differ from the first to third colors, or that in the area 31 only two zones, for example the zones 41 and 42, are provided which generate two different colors at the particular angle of observation and/or illumination.

In a further embodiment the second or another of the further zones arranged next to each other, in particular one of the zones 42, 43 or 44, has scattering structures. Such scattering structures distribute incident light at different angles, whereby the color impression of this zone appears dark compared with zones without a scattering structure. Zones that appear dark are particularly suitable for achieving an easily recognizable color contrast. The scattering structures are advantageously randomly or pseudorandomly arranged microstructures, in particular isotropic or anisotropic matte structures. Preferably, the average lateral size of such microstructures is in the range of from 400 nm to 5 μm and particularly preferably in the range of from 500 nm to 2 μm. In an embodiment, the scattering structures are composed of microstructures which have depths which lie in the same range as the thicknesses of the interference layer of the other zones.

As represented by way of example in FIG. 2a, the color regions 31 have in each case a combination of two or more of the zones 41 to 44. On the basis of the dimension of the zones 41 to 44 and because these are arranged here next to each other within a respective color region 31, the human observer perceives, in the respective color region 31, a mixed color effect which is determined by color mixing of the color generated by the respective zones 41 to 44 in the respective color region in the event of illumination. As at least the zones 41 and preferably also the zones 42 to 44 generate the color by means of a thin-film interference filter by interference, a different color mixing results at each angle of observation and/or illumination, with the result that the color regions 31 display a complex color gradient dependent on the angle of observation and/or angle of illumination.

By "zones arranged next to each other" is meant in this connection an arrangement of zones such that a color mixing of the colors generated by these zones results when these zones are observed. Zones arranged next to each other thus need not adjoin each other directly, but can also be arranged spatially spaced apart from each other within the color region, wherein in this case the zones are arranged at a distance from each other of less than 300 μm, in particular less than 200 μm, preferably less than 100 μm, i.e. the distance between the boundary lines is less than the above-named values.

It is particularly advantageous here if the color regions 31 have a width and/or length of less than 300 μm, as it is ensured in this way that all of the zones of the color region are arranged next to each other within the meaning of the invention and a color mixing results between the colors, generated by the different zones of the color region. The zones have a width and/or length matched to this which preferably lies between 300 μm and 5 μm, further between 150 μm and 5 μm, in particular between 150 μm and 10 μm, further between 80 μm and 10 μm and in particular preferably between 80 μm and 20 μm.

In addition to the color regions 31, the area 21 can have still further color regions, for example the color regions 32 shown in FIG. 2a, in which a color is not generated by the above-described effects in the event of illumination. Thus, it is possible for example that, in the color regions 32, only one or more similar zones, for example one or more zones 41, one or more zones 42, one or more zones 43, or one or more zones 44 are provided, i.e. there the color of the color region is not generated by the above-mentioned color mix effect.

By the arrangement of the color regions 31 and optionally 32 in the area 21 various optically variable effects, for example movement effects or transformation effects or high-resolution color effect images, can be generated. It is advantageous here if the proportion of the color regions 31 in the color regions in the area 21 is more than 10%, in particular more than 50%, preferably more than 70%, further preferably more than 90%.

In an advantageous embodiment, the zones 41 to 44 make up 100% of the surface of the color regions.

Furthermore, embodiments in which the color regions of the area 21 in each case form an image spot 30 of a first motif are also particularly interesting. The motif can be a simple pattern such as e.g. a multi-colored flag, a clipart drawing or also a high-resolution color image. FIGS. 2c to 2e show these three examples in top views.

For this, for example as shown in FIG. 2b1, in a first step the color gradient and the brightness or the color coordinates of each image spot 30 of a motif, e.g. an original image, can be determined. The image spots 30 here have for example a width dimension 73 and a length dimension 74 of between 300 μm and 30 μm, further between 150 μm and 30 μm and in particular between 150 μm and 50 μm.

The color values and brightness values of the image spot 30 are converted into corresponding surface proportions of the zones 41 to 44, with the result that in the case of a corresponding color mixing at a particular angle of illumination and/or observation the color value and the brightness of the image spot of the original image is generated by this. Corresponding to their surface proportion, a corresponding number of zones 41 to 44 is provided in the color region 31. In the embodiment example according to FIG. 2b2, the zones provided in the color region 31 here are formed uniform and preferably have a square or rectangular shape, wherein the width 72 and/or length 71 of the zones is preferably chosen between 150 µm and 5 µm and further between 20 µm and 80 µm. In the embodiment example according to FIG. 2*b*2, the color region 31 thus has thirty-six zones with a size of 50×50 µm. In this example the color region 31 has a length 76 by a width 75 of 300 µm by 300 µm. The determined surface proportions of the zones 41, 42, 43 and 44 here are furthermore converted into a corresponding number of zones to be provided in the color region 31 and these zones are then preferably provided in a pseudo-random arrangement in the color region 31. Thus, for example, at a particular angle of observation the zones 44 display a black color, the zones 43 display a blue color, the zones 42 display a red color and the zones 41 display a green color. For the human observer, for example an image spot which appears in a light-green color hereby results for the example in FIG. 2*b*2 in the event of observation from a normal observation distance. In summary, the color regions thus correspond to the color pixels of the original image or the motif to be generated. The zones within the color region provide the individual basic colors to be mixed, for example analogously to the red, green and blue subpixels (with red, green and blue as basic colors) of an LCD screen. While the brightness of the four subpixels arranged in the so-called Bayer pattern is varied in the case of an LCD screen in order to produce a particular color, in the case of the optically variable element described in this document the surface proportions of the zones within a color region are varied in order to vary the resultant mixed color of the color region which is formed by color mixing of the basic colors of the zones of this color region. In order that a true-color motif forms, all types of subpixels must have the correct thickness of the interference layer for the color or basic color assigned to them. This is a significant technical obstacle to production, which ensures a high degree of protection against forgery of the optically variable element.

In the area 21 for generating the above-described effects the optically variable element 11 is constructed for example as described with reference to FIG. 3*a* to FIG. 11*b* below:

FIG. 3*a* and FIG. 3*b* show a possible structure of the optically variable element 11 in the area 21. The optically variable element 11 has an interference layer 17 which is arranged between two layers 14 and 19 which differ in terms of their refractive index from the refractive index of the interference layer 17. The layers 14 to 19 form a thin-film interference filter 15.

The interference layer 17 has an upper boundary surface 152 and a lower boundary surface 151. The thickness of the interference layer 17 preferably lies between 50 nm and 500 nm, in particular between 70 nm and 400 nm, further preferably between 70 nm and 250 nm. The thickness of the interference layer 17 here is varied such that it has an average layer thickness $d_1$ in the zones 41 and an average layer thickness $d_2$ in the zones 42. The layer thicknesses $d_1$ and $d_2$ differ here, wherein in the embodiment example according to FIG. 3*a* the layer thickness $d_2$ is smaller than the layer thickness $d_1$. FIG. 3*a* is not shown to scale. The widths Δx of the zones are much larger than the average layer thicknesses d. The rounding off of the edges shown is preferably present only relatively close to the edges and does not extend up to half of the zones.

The variation in the layer thickness of the interference layer 17 can be achieved for example via a surface relief in the boundary surface 152 of the interference layer 17. The surface relief here is preferably formed by a substantially rectangular surface relief, the edges of which between the elevations and depressions of the surface relief preferably deviate by not more than 30°, further preferably not more than 15° from the perpendicular (Z axis), which is preferably defined by the surface normal of the surface of the layer 14 facing away from the interference layer 17 (by which a plane defined by the X and Y axes is spanned).

The elevations and depressions of the relief structure here, as shown in FIG. 3*a*, are arranged such that the average relief depth in the zones 41 differs from the average relief depth in the zones 42 by the depth $t_1$. Preferably, the surfaces of the elevations and depressions here are aligned at the same angle to the x/y plane, in particular aligned parallel to x/y plane. In other words the surfaces of the elevations and depressions are not tilted relative to each other.

The boundary surface 151 of the interference layer 17 is preferably shaped flat (see FIG. 3*b*) or substantially flat (see FIG. 3*a*), with the result that a different average layer thickness in the zones 41 and 42, namely the average layer thicknesses $d_1$ and $d_2$, results. Preferably, for this, the difference between the maxima and minima of the boundary surfaces 151, which is called depth $t_2$ below, is less than 70%, preferably less than 50% and particularly preferably less than 30% of the relief depth $t_1$. In order to achieve a correspondingly different average thickness of the interference layer 17 in the zones 41 and 42, however, it is furthermore also sufficient if $t_2$ is smaller than $t_1$.

In addition, it is preferred if the depth $t_2$ is smaller than 500 nm, furthermore smaller than 300 nm, preferably smaller than 200 nm and further preferably smaller than 100 nm.

The layer 14 is preferably formed largely transparent (preferably more than 90% transmission) at least in the wavelength spectrum visible to the human observer. The layer 14 preferably consists of a plastic film or a varnish layer.

The layer 19 preferably consists of a varnish layer or adhesive layer, which is preferably formed transparent (preferably more than 90% transmission) in the wavelength range visible to the human observer. However, the layer 19 can also be formed by a reflective layer, for example a metal layer.

The interference layer 17 preferably consists of a high refractive index material, for example of titanium dioxide ($TiO_2$) or zinc sulfide (ZnS). The high refractive index material can, however, also be a mixture or hybrid material of an organic matrix material and high refractive index particles embedded therein, in particular nanoparticles. High refractive index hybrid materials have the advantage that they can be printed. $TiO_2$ nanoparticles with a diameter of approx. 50 nm embedded in polyvinyl alcohol (PVA) are an example of such a material.

Furthermore a dark-colored, for example black-colored, layer 20 is also optionally applied to the back side of the thin-film interference filter 15. The layer 20 here can also be applied only partially, for example applied in the form of a logo, writing etc.

Furthermore, it is also possible that further optional layers are provided above the layer 14, for example the layer 13 shown in FIG. 3*b*. The layer 13 can be e.g. a single-layered or multi-layered protective layer, in particular with particularly good mechanical and/or chemical resistance.

The arrangement and shaping of the zones 41 and 42 in a color region 31 is shown by way of example in FIG. 3*c*: The zones 41 and 42 here preferably have a rectangular or L-shaped shape, wherein the zones 41 have lateral extents $\Delta x_1$ and $\Delta x_3$ in x-direction and the zones 42 have lateral extents $\Delta x_2$ and $\Delta x_4$ in x-direction. The zones 41 and 42 have corresponding lateral extents $\Delta y_1$, $\Delta y_2$, $\Delta y_3$ and $\Delta y_4$ in y-direction (not drawn in FIG. 3c).

In the color region 31, two or more zones arranged next to each other, the zones 41 and 42, are provided, wherein the interference layer 17 of the thin-film interference filter 15 has an average thickness $d_1$ in one or more zones 41 and has an average thickness $d_2$ different from this in one or more zones 42 and the thin-film interference filter 15 thus generates different colors dependent on the angle of illumination and/or observation in the zones 41 and 42.

The width and/or length dimension of the zones 41 and 42 here are chosen smaller than 300 μm, in particular smaller than 150 μm, further preferably smaller than 80 μm. Furthermore, the width and/or length dimensions of the zones 41 and 42 are chosen larger than 3 μm, furthermore larger than 5 μm, in particular larger than 10 μm, particularly preferably larger than 20 μm. For this, for example in the embodiment example according to FIG. 3a to FIG. 3c, the lateral dimensions $\Delta x_e$ and $\Delta y_e$ are chosen correspondingly and preferably chosen between 300 μm and 5 μm, in particular between 150 μm and 10 μm and preferably between 80 μm and 20 μm. For one thing, disruptive diffractive effects can hereby be avoided. In addition, it is hereby brought about that neighboring zones 41 and 42 of the color region 31 generate for the human observer an optical impression determined by a color mix effect, such as described below. Thus, incident light beams 51 from a particular direction of illumination Θ are shown by way of example in FIG. 3a. These light beams are at least partially reflected at the boundary surfaces 151 and 152 of the interference layer 17, as is shown in FIG. 3a for the reflection at the boundary surface 151. Here, the angle of illumination is identical to the angle of observation. Because of the small layer thickness of the interference layer 17, different colors 52 and 53 are thus generated in the zones 41 and 42 by means of interference at a particular angle of observation, which colors are perceived, because of the dimension and position of the zones 41 and 42, by the eye 50 of the human observer in the form of a mixed color effect 54 the color of which differs from the colors 52 and 53. The colors 52 and 53, which are generated by the interference filter 15 in the zones 41 and 42, further change depending on the angle of illumination and/or angle of observation, with the result that correspondingly different mixed color effects also result for the human observer in different directions of illumination and observation.

In addition to the complex pattern shown in FIG. 3c, in which the zones 41 and 42 are composed of areas with differently sized elongate fields in which the lateral alignment of the longer side likewise also varies, it is also possible to arrange the zones 41 and 42 in the form of a checkerboard pattern with a grid below the resolution limit of the human eye in the color region 31 or to provide only one zone 41 and one zone 42 in one color region only.

The color effect generated in the color region 31 is further influenced by the surface proportion of the zones 41 and 42 in the color region 31. The drawing FIG. 3d thus shows, as an example, the reflection spectrum of an embodiment example according to FIG. 3a and FIG. 3b, in which a polymer material with a refractive index of 1.5 is used for the substrate layers 14 and 19 and a material with a refractive index of approx. 2.4 is used for the interference layer 17. The average layer thickness $d_2$ is 200 nm and the average layer thickness $d_1$ is 125 nm. The spectra here are given for an angle difference between angle of illumination and angle of observation of 2×30°. In the diagram, in the direction of the axis 61 the wavelength is specified in nanometers and in the direction of the axis 62 the reflectivity of the thin-film interference filter 15 is specified in the color region 31 at a surface proportion of the zones 42 of 100% (125 nm), of the zones 41 of 100% (200 nm), a ratio of the surface proportions of the zones 41 to zones 42 of 50 to 50, of 30 to 70 and 70 to 30.

The optically variable element 11 is produced for example by shaping the surface relief shown in FIG. 3a into the layer 14 by means of thermal replication or UV replication and then applying the material of the interference layer 17 preferably in liquid form. Alternatively, the surface relief shown in FIG. 3a can be introduced into the layer 14 in particular by means of laser ablation. Finally, the layer 19 and the layer 20 are applied.

In this case, a substrate which is formed as follows is used for the layer 14: Preferably a directly thermally replicable substrate such as for example PMMA or PC film (PC=polycarbonate) is used as substrate. The embossed structure can be introduced directly into this with suitable embossing parameters. Furthermore, carrier films with an applied replication layer of thermoplastic material can also be used as substrate. An example of this is a polyester film with an embossable acrylic varnish layer. Optionally, an adhesion promoter layer or a detachment layer can also be provided between the film and the replication layer. The detachment layer preferably consists of a mixture of waxes, polymers and further additives. Furthermore, a UV-curing replication layer can be used as replication layer.

Furthermore, it is also possible that the interference layer 17 is applied to the layer 19 and then the surface relief is molded into the exposed surface of the interference layer 17 by means of a replication tool. For this, it is possible that firstly an embossable interference layer of higher refractive index is deposited onto a smooth substrate and then the variation of the layer thickness of the interference layer is embossed in an embossing process into the layer of higher refractive index. Then the layer 14 is subsequently applied.

Furthermore, it is also possible that the boundary surface 151 is formed flat in the interference layer 17, as is shown in FIG. 3b.

A smooth boundary surface can, on the one hand, be achieved by a suitable coating or printing technique combined with an optimized viscosity and/or wettability and/or slow evaporation behavior of the solvent. On the other hand, it is also possible to smooth down the boundary surface by an additional tempering step—preferably with a temperature close to or above the so-called glass-transition temperature of the material of the interference layer. Another possibility for smoothing down the surface is to expose it to a suitable solvent vapor.

These different methods can also be combined. Furthermore, it is also possible not to embed the interference layer 17 on both sides in polymer layers, with the result that for example one of the boundary surfaces 151 or 152 acts against air.

In addition, it is also possible that still further zones, in which the interference layer has an average layer thickness which differs from the average layer thickness $d_1$ and $d_2$, are provided in the color region 31. Even more complex mixed color effects can be generated hereby in the color region 31.

Figure 4A:
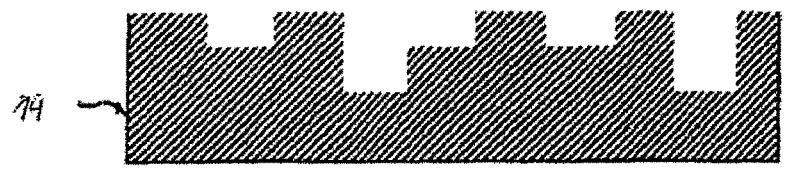

In addition, corresponding mixed color effects can also be realized by means of an interference layer system consisting of three layers comprising an absorption layer, a spacer layer acting as interference layer and a reflective layer. A corresponding production method is explained below with reference to FIG. 4a to FIG. 4e:

For the production of the optically variable element, the process here can thus be as follows:

In a first step, firstly a surface relief with two different depths is impressed into a flexible substrate 14, as is shown in FIG. 4a. The substrate 14 can be for example a plastic film, a replication varnish or a laminar structure of several layers, for example a plastic film and a replication varnish. The impressing of the surface relief is preferably carried out by means of thermal or UV replication. For this, see also the above statements about the layer 14 according to FIG. 3a and FIG. 3b.

By using a surface relief with two different depths, three different zones with different layer thicknesses in the interference layer can be produced. By correspondingly increasing the number of depth levels of the surface relief, still further different zones with different thicknesses of the interference layer can be provided.

The embossing depths here are chosen such that they correspond to the difference between the desired layer thicknesses of the interference layer in the zones in which the surface relief is impressed, and the thinnest layer thickness corresponds to the interference layer in the zones in which the surface relief is not molded.

The master structure for the embossing tool can be produced for example by means of electron-beam lithography or laser beam lithography or laser ablation or also by means of photolithography with several illumination masks for the different relief depths. The illumination masks are for example aligned in a mask aligner in such a way that in the event of illumination the zones of different depths are positioned relative to each other with a precision of a few micrometers. Each mask serves to produce one kind of zone with in each case the same depth in the master. For the duplication of these structures in mass production, these structures are molded for example by means of galvanic copying onto corresponding embossing tools and then molded into the substrate 14 by means of replication, for example in a roll-to-roll process.

Figure 4B:

A semi-transparent absorber layer is then applied, as is shown in FIG. 4b. The absorber layer 16 can be applied for example by means of evaporation or sputtering and preferably consists of a 5 to 10 nm thick metal layer, preferably of chromium, titanium, nickel, silver or copper.

Figure 4C:
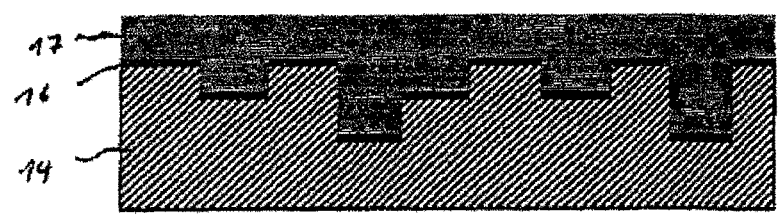

In a next step, which is shown in FIG. 4c, a transparent spacer layer is applied as interference layer 17. The material of the spacer layer here is preferably applied in liquid form, preferably a solution, in order to achieve the advantages already described above. Preferred coating methods here are gravure printing, doctor blading, silk-screen printing as well as curtain and cascade coating. Preferably a varnish, for example a nitrocellulose varnish (NC varnish), which preferably has a refractive index of about 1.5, is applied as material for the spacer layer.

The applied quantity here is set such that for example in first zones an average layer thickness of the interference layer 17 of 425 nm, in second zones an average layer thickness of the interference layer 17 of 350 nm and in third zones an average layer thickness of the interference layer 17 of 300 nm results. As already stated above, additional methods can also be used here in order to form the surface of the interference layer 17 facing away from the relief structure as smooth as possible.

Figure 4D:
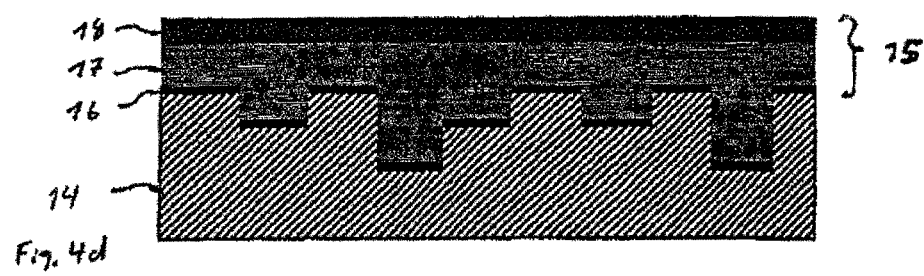

A reflective layer 18 is then applied, for example by evaporation or sputtering with a metal layer. The reflective layer here can be formed both opaque and semi-transparent, which can be set for example by the choice of the layer thickness of the metal layer. Thus, for example, an aluminum layer of 50 nm can be applied in order to guarantee a largely opaque appearance, or for example a silver layer of 10 nm can be applied in order to form the reflective layer semi-transparent. This is shown in FIG. 4d.

Figure 4E:
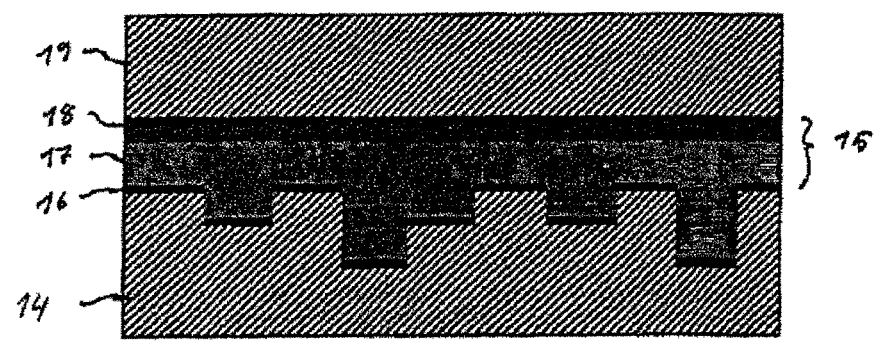

Optionally, another layer 19 can then be applied, which is preferably a protective varnish layer and/or adhesive layer. This is shown in FIG. 4e.

Furthermore, an inverted layer structure is also possible, in which after the embossing step the reflective layer 18 is applied first, then the interference layer 17 and only after that the semi-transparent absorber layer 16. In the case of a non-transparent reflective layer 18, the color effect here is visible from the other side.

Furthermore, it is also possible to achieve the different average thickness of the interference layer in the different zones by means of a printing process in which the interference layer is constructed in a corresponding height profile on a smooth substrate by one or more printing processes. For this, for example, a smooth substrate is provided either with the absorber layer or with the reflective layer and then the common interference layer is applied by means of printing such that it has in each case a different average thickness in different zones.

In addition, it is also possible to apply either the absorber layer or the reflective layer to the substrate 14, then to apply the material of the interference layer and then to mold into the interference layer a corresponding surface relief profile which generates a corresponding different thickness of the interference layer in the different zones.

Here, preferably, a UV-curable polymer is used as material for the interference layer and the surface relief profile is introduced by means of UV replication. The advantage is hereby achieved that the mechanical loading of the carrier substrate by the replication process is reduced and thus an almost flat surface is achieved on the boundary layer of the interference layer opposite the surface relief. Alternatively, the surface profile can be introduced into the interference layer by means of laser ablation.

Furthermore, it is also possible to mold the surface profile into the substrate 14 and then to apply the absorber layer 16 or reflective layer 18. For this, the reflective layer 18 or absorber layer 16 is applied to a smooth second substrate 14 in an intermediate step. Then the interference layer 17 is applied to one of the two substrates and both substrates are laminated together with the surfaces coated with the absorber layer 16 or reflective layer 18 opposite each other. For this, the material of the interference layer 17 must be flexible enough in order to fill in the depressions of the surface relief profile during the lamination process. For example, the material can even be liquid or middling or highly viscous and can be hardened, e.g. by means of UV radiation, when the correct layer thicknesses have been achieved in the zones of the interference layer.

FIG. 5a and FIG. 5b illustrate by way of example the structure of an optically variable element 11 which is provided in the area 21 with a layer system produced in this way.

As shown in FIG. 5a, in the area 21 the optically variable element 11 has the substrate 14, the interference layer 17, the absorber layer 16, the reflective layer 18 and the protective varnish or adhesive layer 19.

The semi-transparent absorber layer 16 preferably consists of one of the following materials or of an alloy of the materials: chromium (Cr), nickel (Ni), Inconel alloys, copper (Cu), titanium (Ti), silver (Ag), gold (Au), tin (Sn), palladium (Pd), tungsten (W), molybdenum (Mo), iron (Fe) or carbon (C).

The interference layer 17 preferably consists of a polymer system or hybrid system (mixture of inorganic particles embedded in an organic matrix). Varnish systems are preferably used here which can be applied by means of gravure printing. The interference layer consists for example of a varnish system based on nitrocellulose, epoxy, polyester, colophony, acrylate, alkyl, melamine, PVA, PVC, isocyanate or urethane systems. Varnish systems in which slowly evaporating solvents such as e.g. water, anisole, ethyl acetate or isopropyl alcohol or mixtures with proportions of these solvents are used are preferred. Examples of water-based varnish systems are polyelectrolytes such as polydiallyldimethylammonium chloride (PDADMAC), polyvinylpyridine (P2VP or P4VP), polystyrene sulfonate (PSS), polyacrylic acid (PAA), polymethacrylic acid (PMAA) and the like. Furthermore, UV-curable varnish systems can also be used here. An example of a high refractive index hybrid system is a mixture of 50%$_{vol}$ PbS nanoparticles in a gelatin matrix. Additional security features, for example fluorescent dyes, magnetic particles or DNA, can additionally also be added to the interference layer 17.

The reflective layer 18 preferably consists of a vapor-deposited or sputtered aluminum layer with a layer thickness of between 30 nm and 50 nm. The reflective layer can also consist for example of Ag, Cu or Cr.

Due to the surface relief profile molded into the substrate 14, the interference layer 17 has an average layer thickness $d_1$ in the zones 41, an average layer thickness $d_2$ in the zones 42 and an average thickness $d_3$ in the zones 43. In the zones 41 to 43 in each case a thin-film interference filter 15 comprising the absorber layer 16, the interference layer 17 and the reflective layer 18 is thus provided by the layer system, with a correspondingly different average thickness $d_1$, $d_2$ and $d_3$ respectively of the respective interference layer. The thicknesses $d_1$, $d_2$ and $d_3$ are chosen for example such that the zones 41, 42 and 43 generate the colors blue ($d_3$), green ($d_2$) and red ($d_1$) respectively for example in the event of perpendicular illumination and observation. It is furthermore advantageous if additionally zones 44—not shown in FIG. 5a—are also provided in which the average thickness $d_4$ of the interference layer 17 is chosen such that in the event of illumination the color black or dark brown is generated in the event of perpendicular observation and illumination. Alternatively, the zones 44 can also have scattering structures or matte structures which reduce the color effect of the interference filter in the zones 44 and thus produce zones that appear dark.

Through a combination or by combinations of the zones 41, 42, 43 and 44, it is thus possible for example to generate in the one color region 31 true colors or in the area 21 true-color images in which for example each image spot of the true-color image corresponds to a color region and the color of each color region is determined by a corresponding combination of sub-combination of zones 41, 42, 43 and 44.

The color impression white can be generated here for example by choosing the surface proportion of the zones 41 to 43 in the color region such that the resultant color is positioned on or very close to the white point in the color space or chromaticity diagram (e.g. CIE diagram).

FIG. 5b shows a corresponding top view of a color region 31 with several zones 41, 42, 43 and 44. The dimension of the zones 41 to 44 is—as already described above—chosen such that their width and/or length dimension is smaller than 300 μm, preferably between 3 μm and 300 μm, furthermore between 5 μm and 300 μm, preferably between 10 μm and 150 μm and particularly preferably between 20 μm and 80 μm. Correspondingly, the lateral dimensions $\Delta x_1$ to $\Delta x_8$ are chosen in this value range.

FIG. 5c now shows a reflection spectrum of the optically variable element 11 in the zones 41 to 44. In the diagram the wavelength of the light in nanometers is given in the direction of the axis 61 and the reflectivity in the direction of the axis 62. The diagram is provided by way of example for a layer structure with a polymer substrate as substrate 14, an 8 nm thick chromium layer as absorber layer 16, a polymer layer as interference layer 17 and a 50 nm thick aluminum layer as reflective layer 18. The average layer thicknesses of the interference layer 17 in the zones 41 to 44 are chosen here as follows: $d_1$=425 nm, $d_2$=350 nm, $d_3$=300 nm and $d_4$=90 nm. The reflection spectrum according to FIG. 5c here is represented for an angle difference between angle of illumination and angle of observation of 2×30°. Angle of illumination and angle of observation are thus identical, as is usual in the case of effects in direct reflection.

FIG. 6a and FIG. 6b illustrate a further possibility for the structure of the optically variable element 11 in the area 21. FIG. 6b here shows by way of example a sectional representation of the interference layer 17 of the optically variable element 11 in a partial area of the area 21. As is represented there, the average thickness of the interference layer 17 is varied over the area 21 such that in the areas 41 to 44 in each case the average layer thickness has a different value, i.e. for example is formed as explained previously with reference to FIG. 5c. The zones 41 to 44 here have in each case a square shape and have here the size dimensions already stated above. The area 21 here can form a single color region or also a plurality of color regions which have in each case at least two different zones of the zones 41 to 44. If the optically variable element is tilted, the coloring changes for example from the coloring as a true-color image to a coloring as a false-color image which represents a very striking feature. This color change is represented strikingly in the drawings FIG. 6c and FIG. 6d. In order to produce a true-color image like that in FIG. 6c, the process can be as follows: The resolution of the original image is first adapted taking into account the size of the color regions 31 intended in the film (e.g. 150 μm×150 μm), with the result that the external dimensions of the image in the film have the desired value (e.g. 20 mm×20 mm). Then, for each color pixel of the original image, the color coordinates (e.g. RGB value) are converted into a surface proportion of the different zones in the color regions 31. The image constructed from these color regions is then produced with the corresponding thicknesses of the interference layer in the zones.

A technical obstacle during the production of the optically variable elements by means of wet-chemical coating, in particular by means of printing, of the interference layer is as follows:

In the case of a wet-chemical coating, a certain amount of solid is applied, dissolved in solvent, homogeneously over the relief structure. In the case of roll-to-roll printing methods, the applied amount of solid is usually given in g/m². The density of printed varnishes is often approximately 1 g/cm³. For a varnish layer that is for example 425 nm thick after drying, an applied solids quantity of 0.425 g/m² is consequently required. If there is a solids content of 10% and a solvent proportion of 90% in the varnish, this means that the wet layer thickness of the varnish layer at the start of the drying phase is approximately 4.25 μm homogeneously over the relief structure. The solid must now be distributed in the drying phase such that the necessary average (dry) layer thicknesses in the different zones are achieved.

To generate the different thickness of the interference layer in the different zones or to smooth down the boundary layer or boundary surface opposite the surface relief, material must flow from zones with a smaller average thickness of the interference layer to zones with a larger average thickness of the interference layer. This occurs, even in the case of print layers that dry relatively quickly, at a sufficiently small spacing of the corresponding zones.

If a desired motif consists of larger, uniform color surfaces, e.g. the German flag sketched in FIG. 2c with three color regions 31 forming in each case a uniform color surface, the color regions 311, 312, 313, then the material must flow over large distances, which leads to problems in the case of rapid printing processes. In the example of the German flag, a relatively large amount of material would have to flow from the black, uppermost band with an average thickness of the interference layer in the zones of approximately 90 nm to the red band in the center with approximately 425 nm average thickness. If the flag is e.g. 15 mm tall, this would mean that the printed material must flow up to 5 mm during the drying process. This cannot be realized easily in technical terms.

It is particularly advantageous to ensure that the thickness of the interference layer averaged over all zones of the color regions 31 is identical or almost identical for all color regions 31.

This can be achieved via the insertion of so-called sunk zones. Such sunk zones are characterized by a much greater embossing depth $t_v$ compared with the color-generating zones. The method, described above with reference to FIGS. 4a to 4e, for the production of an optically variable element is thus preferably modified by using such sunk zones, as is also explained below with reference to FIG. 7a to FIG. 7c.

In respect of the design of the layers and of the basic procedure of the method, reference is made in respect of the embodiment example according to FIG. 7a to FIG. 7c to the above statements about FIG. 4a to FIG. 4e. FIG. 7a shows a schematic sectional representation of a section of the surface relief molded into the substrate 14 and several zones 41, 42, 43 and 44 as well as such a sunk zone, the zone 49. In the zones 41 to 44 as well as 49 the surface relief, as shown in FIG. 7a, has in each case a different relief depth, the relief depth $t_1$ to $t_4$ as well as $t_v$. The zones 41 to 44 with the relief depths $t_1$ to $t_4$ are color-generating zones. The relief depths $t_1$ to $t_4$ are based on an unstructured edge, as shown in FIG. 7a. The zones 41 to 44 produce for example the basic colors red, green, blue and black. The zone 49 with the relief depth $t_v$ forms a sunk zone which serves to accommodate the material of which there is too much in this color region 31. If the thickness of the interference layer in the sunk zone is thick enough, it only produces relatively dark color shades, e.g. gray, which does not impair or only slightly impairs the optical appearance of the desired motif. For this, the thickness of the interference layer in the sunk zones is preferably larger than 500 nm, in particular larger than 700 nm. Furthermore, the thickness $d_v$ of the interference layer in the sunk zones, the zones 49, lies between 500 nm and 5000 nm, preferably between 700 nm and 2000 nm.

FIG. 7b schematically shows the flow of the still liquid material of the interference layer 17 from the color-generating zones 41 to 44 into the sunk zone, the zone 49. Because of the spatial proximity of the sunk zones, the zone 49, to the color-generating zones 41 to 44 with a small thickness of the interference layer 17, the material has enough time to flow into the sunk zones, the zones 49.

For this, the delimitation of the lateral expansion of the color regions 31 to less than 300 µm is furthermore helpful. This has the result that the boundary layer or boundary surface opposite the surface relief is smoothed down better.

FIG. 7c shows a schematic sectional representation of an optically variable element with a complete interference filter according to FIG. 4d, i.e. after evaporation of the dried interference layer 17 with the reflective layer 18, for example a mirror layer of aluminum. The interference layer 17 has an average thickness d1, d2, d3 and d4 respectively in the zones 41 to 44, an average thickness $d_v$ in the sunk zone, the zone 49, and an average thickness $d_r$ in the edge area.

The number of sunk zones required in each color region depends on the sought color impression of the respective color region. This can be explained with reference to the flag from FIG. 2c as follows. The central red band of the flag, the color region 311, requires the largest thickness of the interference layer in the color-generating zones, e.g. 425 nm. The upper black band of the flag, the color region 312, on the other hand requires the smallest thickness of the interference layer in the color-generating zones, e.g. 90 nm. In order that the thickness, averaged over all zones, of the interference layer in the color region 312 is identical to the averaged thickness of the interference layer in the color region 311, sunk zones must be inserted. Color region 311 on the other hand consists in this case only of red, color-generating zones. The sunk zones in the color region 312 must thus balance out the difference—in this case 335 nm—in the thickness of the interference layer. If for example at most ⅓ of the zones of a color region are to be sunk zones, then the ⅓ sunk zones in the color region 312 require a thickness of the interference layer $d_v$ of 1095 nm. (425 nm=⅔×90 nm+⅓×$d_v$).

The lower, yellow band of the flag—color region 313—is composed of 50% red and 50% green color-generating zones. Let the thickness of the interference layer in the green zones be 350 nm. In this case, the insertion of approximately V=5% sunk zones with the thickness of the interference layer $d_v$ of 1095 nm is sufficient to obtain roughly the same thickness, averaged over all zones, of the interference layer as in the color regions 311 and 312 (425 nm=(50%−V/2)× 425 nm+(50%−V/2)×350 nm+1095 nm×V).

Preferably, the proportion V of the sunk zones in each color region 31 is less than 50%, further preferably less than 30%, in particular less than 20% and in particular preferably less than 10%. The smaller the proportion V of the sunk zones, the less the color impression of the color region is impaired.

The relief depth of the zones 41 to 45 was defined in FIG. 7a with reference to an unstructured edge. The interference layer 17 consequently has there the average thickness of the thickness of the interference layer of the color regions 31. Thus if an unstructured edge is provided with the same interference filter as the motif area, then this edge displays a homogeneous color effect which can be used as an additional feature of the optically variable element. The color change in the motif area here contrasts with the color change in the edge area. FIG. 2e shows this edge in a schematic top view as an example of a frame around a true-color image.

Furthermore it is advantageous, as already described above, to provide in the area 21 color regions 31 which display metameric colors at one or more angles of illumination or observation. Metameric colors here are colors which call up the same color impression for the human observer but are generated by the color mixing of different color pairs. The drawing FIG. 8 shows this schematically in a CIE chromaticity diagram. The colors C1 and C2 mixed in a ratio of approximately 30% to 70% result in the same mixed color Cm as a mixture of the colors C3 and C4 in the ratio of 70% to 30%. As the colors C1 to C4, if these are generated by thin-film interference filters with interference layers of different average layer thickness, also have differently colored effects, corresponding metameric effects can be realized which occur at predetermined, particular angles of observation and/or illumination and for example display to the human observer a change or transformation of a motif or movement effect as security feature in the event of tilting. Furthermore, it is also possible that in a second area for example the true-color image shown in FIG. 6c is realized with a different set of zones 41 to 44, in which one or more of the average layer thicknesses of the interference layer in the zones 41 to 44 differ. By tilting such a security feature, for example the effect is then to be seen such that the two images, which appear to be identical in one or more directions of illumination and observation, change into different false-color images in the event of tilting.

Alternatively or in addition, the design of the security feature can have an optical interplay or interaction with printed images which directly adjoin the security feature. The printed images can also be arranged only very close to the security feature.

A further possible structure of the optically variable element 11 in the area 21 is shown by way of example in FIG. 9.

FIG. 9 shows a substrate 14, on which a colored varnish layer 25 is printed in zone 45, 46 and 47. The colored varnish layer 25 here in turn consists of partial areas 26, 27 and 28, in which different dyes and/or pigments are contained in the colored varnish layer, with the result that the colored varnish layer 25 generates a different color in these partial areas in the event of illumination. Then a layer system, forming a thin-film interference filter 15, consisting of the absorber layer 16, the interference layer 17 and the reflective layer 18 is applied to the colored varnish layer 25. Optionally, the layer 19 is then also applied.

In respect of the possible structure of the thin-film interference filter 15, reference is furthermore also made to the above statements about FIG. 3a to FIG. 8.

In the area 21, for one thing, zones 41 are thus provided in which the colored varnish layer 25 is not provided, and thus a color is generated for the observer by the thin-film interference filter 15 by means of interference. In the zones 45, the partial areas 26 of the colored varnish layer 25 are provided, with the result that in the zones 45 the color is generated by the dyes and/or pigments provided in the partial areas 26 in the event of illumination. Correspondingly, further zones 46 and 47 are provided in which a respective color is generated by the dyes and/or pigments provided in the partial areas 27 and 28 respectively. The zones 41, 45, 46 and 47 here have the width and/or length dimensions already stated above which preferably lie in a range of from 5 µm to 300 µm, in particular 10 µm to 150 µm and particularly preferably in the range of from 20 µm to 80 µm. The optically variable element thus has one or more color regions in which the color being displayed at a particular angle of illumination and observation is produced by a color mix effect between the color generated in the zones 41 by means of interference and the color generated in one or more of the zones 45 to 47 by a dye and/or a pigment.

Furthermore, it is also possible to provide in the area 21 another number of different zones provided with a colored varnish layer displaying a different color and/or to combine this embodiment example with one of the previously described embodiment examples. It is thus advantageous to provide, not just one type of zones, but different types of zones in which the color is provided in the event of illumination by interference by means of a thin-film interference filter which has a different average thickness of the interference layer 17 in these zones.

Preferably gravure printing, flexographic printing or silk-screen printing is used as printing technique for printing on the colored varnish layer 25. The zones 45 to 47 can thus display for example a blue, a green and a black color. The thin-film interference filter 15 arranged in the zones 41 displays for example a color change from red to green in the event of tilting. For example, for this, the absorption layer 16 is formed as an 8-mm chromium layer, the interference layer 17 is formed as a 600-nm $MgF_2$ layer and the reflective layer 18 is formed as a 50-nm Al layer.

According to a further preferred embodiment, the optically variable element 11 provides a window security feature. For this, for example in the three-layered structure shown above both the absorber and the reflective layer is formed as a semi-transparent layer, for example formed by a 10 nm thick silver layer. In this case, the same color effect image appears on both sides, but mirrored. Furthermore, it is also possible to apply a further layer 14 to the back side of the reflective layer 18 in order to form a window security feature, to emboss this further layer and then to apply a further thin-film interference filter 15 in reversed order. In such a structure, different images can be realized in the event of observation from different sides, or also identical, but not mirrored, color effect images. This embodiment can be combined with all of the above-described embodiments.

A further embodiment in which the optically variable element 11 provides a window security feature provides that the reflective layer of the thin-film interference filter 15 is partially removed, in particular by means of known demetallization methods. A replication varnish and/or photoresist which can optionally be dyed is applied to the partially demetallized reflective layer. Optionally, diffractive structures or anisotropic matte structures can e.g. be replicated into this varnish layer. The varnish layer is then optionally coated with a second reflective layer or a second thin-film interference filter 15, in particular a layer system with three layers, an absorption layer, a spacer layer acting as interference layer and a reflective layer. The second thin-film interference filter 15 here can be constructed as described in this document from color regions 31 and zones 41 to 47. The varnish is then illuminated from the back side with UV radiation, wherein the partially demetallized first reflective layer acts as a photomask. Finally, the dyed varnish layer is partially removed in a washing step or the second reflective layer or the second thin-film interference filter is demetallized in a lift-off process. This embodiment of the optically variable element 11 has, observed from the front or back side, either an optically variable effect and a dyed pattern or two optically variable effects, wherein the demetallized area and the dyed pattern or the two demetallized areas are present registered precisely relative to each other, i.e. positionally accurate or register accurate relative to each other.

A further possibility for making it easier to form a second boundary surface of the interference layer 17 that is as smooth as possible is to provide in the relief structure one or more webs which are molded between two zones or two color regions. Preferably, the webs here are arranged such that the surface relief has one web in the boundary areas between two zones, if neither of the two zones represent a zone with the minimum layer thickness of the interference layer 17.

This is shown by way of example in FIG. 10a and FIG. 10b.

FIG. 10a shows the substrate 14, into which a surface relief is molded. The surface relief here has depressions in two different relief depths, with the result that—as set out above—three different zones with a different average thickness of the interference layer can be set hereby. Between two zones in which an impressing of a relief structure takes place, in each case a web 149 is provided here, as is shown in FIG. 10a. The semi-transparent absorber layer 16 is now applied to the relief structure first, then the interference layer 17 and then the reflective layer 18 as well as an optional adhesive or varnish layer 19.

The application of the absorber layer 16 and the reflective layer 18 can also be dispensed with. This is the case in particular when the thin-film interference filter is realized according to FIG. 3a and FIG. 3b.

In the zones 41 to 43 the interference layer 17 has a different layer thickness, with the result that in this area different colors are generated by means of interference under the same illumination and observation conditions. Webs 149 are additionally provided which reach up to the vertical level of the zones with the smallest thickness of the interference layer 17. In this way, a type of support point for the formation of a smooth, second boundary surface of the interference layer 17 is created. The width of the webs 149 in this example is approximately 15% of the width of the zones 41 to 43. The webs 149 make it easier to keep under control the forces which intend to emulate the structure of the boundary surface oriented to the substrate 14 in the exposed boundary surface during the application of the material of the interference layer 17, in particular during printing and/or subsequent drying of the interference layer.

The width of the webs 149 is preferably between 500 nm and 100 µm, in particular 2 µm to 50 µm and particularly preferably between 5 µm and 30 µm. Preferably, the zones 41 to 43 have in each case lateral dimensions at least twice as large as those of the webs. Particularly preferably, the lateral dimension of the zones 41 to 43 is at least three times as large as that of the webs 149.

Furthermore, it is also possible that the webs 149 at least partially frame, not the individual zones, but the color region. The drawing FIG. 11a shows a schematic top view of a color region 31 which comprises several zones 41, 42 and 43. Here, a web 149 is provided which partially frames the zones 41, 42 and 43 in an L-shaped manner on two sides. Preferably, the web 149 is formed by zones 44 which, of the zones 41 to 44, have the smallest average layer thickness of the interference layer. Thus, for example, at a particular angle of illumination and observation the interference layer filters in the zones 41 to 43 generate a red, green and blue color, whereas the zones 44 generate a black color.

FIG. 11b shows a corresponding formation of a partial area of the area 21 with several color regions 31. As can be seen, the webs 149 frame the individual color regions 31. The individual zones 41 to 44 in this example have a size of 6 by 6 µm and the color regions 31 have a size of 60 by 60 µm.

The webs 149 are represented continuously in the previously represented embodiment examples. However, it is also possible to use the webs with a break which likewise achieves the desired effect for forming a smooth, second boundary surface in the boundary layer. Preferably, the zones and color regions should be at least 50%, preferably at least 70% framed by webs.

Furthermore, it is also possible that the webs 149 are arranged in a grid which comprises several color regions 31. Usefully, the spacing of the webs in x- and in y-direction here is to be chosen in the range of from 30 µm to 1 mm, in particular in the range of from 50 µm to 500 µm, further preferably in the range of from 50 µm to 200 µm.

The invention claimed is:

1. An optically variable element comprising a first security feature disposed in a first area of the optically variable element and a second security feature disposed in a second area of the optically variable element separate from the first area, the first security feature comprising at least one first color region which in the event of illumination generates a mixed color dependent on the angle of observation or angle of illumination, wherein the first color region has two or more zones arranged next to each other which have in each case a width or length dimension of less than 300 µm, wherein a first zone of the zones of the first color region comprises a thin-film interference filter with a reflective layer, an interference layer and an absorber layer, wherein in the first zone the interference layer of the thin-film interference filter has a first average thickness ($d_1$) which is chosen such that in the event of illumination at least one particular angle of observation and/or angle of illumination the thin-film interference filter generates, by means of interference, a color which differs from at least one color which is generated in at least one of the other zones of the first color region in the event of illumination at this angle of observation or angle of illumination, and wherein a second zone of the zones of the first color region has a thin-film interference filter comprising the reflective layer, the interference layer and the absorber layer, wherein the interference layer of the thin-film interference layer filter has a second average thickness ($d_2$) in the second zone, wherein the first average thickness ($d_1$) and the second average thickness ($d_2$) differ from each other by between 20 nm and 500 nm, and wherein the two or more zones of the first color region further comprise one or more sunk zones also comprising a thin film interference layer having the reflective layer, the interference layer and the absorber layer, wherein the average thickness ($d_v$) of the interference layer in the sunk zones is between 500 nm and 5000 nm, wherein the sunk zones are provided to make the thickness of the interference layer averaged over all zones of the first color region to be identical for all color regions.

2. An optically variable element according to claim 1, wherein the first color region has two or more first or two or more second zones.

3. An optically variable element according to claim 1, wherein in at least one third zone and at least one fourth zone of the zones of the first color region a thin-film interference filter are provided, wherein the interference layer of the thin-film interference filter has a third average thickness ($d_3$) in the third zone and a fourth average thickness ($d_4$) in the fourth zone and the third and fourth average thickness ($d_3$) ($d_4$) differs from the first and second average thickness ($d_1$, $d_2$), the first, second, third and fourth average thicknesses differ from each other in each case by between 20 nm and 500 nm.

4. An optically variable element according to claim 3, wherein the first, second, third and fourth average thickness ($d_1$, $d_2$, $d_3$, $d_4$) of the interference layer is selected from the group: 90±30 nm, 300±30 nm, 350±30 nm and 425±30 nm.

5. An optically variable element according to claim 3, wherein the first, second, third and fourth average thickness ($d_1$, $d_2$, $d_3$, $d_4$) is between 50 nm and 1000 nm.

6. An optically variable element according to claim 3, wherein the first, second, third and fourth average thicknesses ($d_1$, $d_2$, $d_3$, $d_4$) of a first group of first color regions differ from the first, second, third and fourth average thicknesses ($d_1$, $d_2$, $d_3$, $d_4$) of a second group of first color regions in such a way that, in one or more directions of illumination or observation, one or more of the first color regions of the first group and of the second group generate metameric colors in the event of illumination.

7. An optically variable element according to claim 3, wherein, in a third area a plurality of color regions are provided which are arranged according to a one- or two-dimensional grid and in each case form an image spot of a second motif, and wherein more than 50% of the color regions in the third area are formed by first color regions, and wherein the first, second, third and fourth average thicknesses ($d_1$, $d_2$, $d_3$, $d_4$) of the first color regions of the first area differ from the first, second, third and fourth average thicknesses ($d_1$, $d_2$, $d_3$, $d_4$) of the first color regions of the third area in such a way that, in one or more directions of illumination or observation, one or more of the first color regions of the first area and of the third area generate metameric colors in the event of illumination.

8. An optically variable element according to claim 3, wherein the optically variable element has a layer system which, in the first, second, third and fourth zones, in each case forms the thin-film interference filter, wherein a layer of the layer system in the first, second, third and fourth zones in each case forms the interference layer of the respective thin-film interference filter and this common interference layer has the first, second, third and fourth average thickness respectively in the first, second, third and fourth zones, wherein the layer system also has an absorber layer and a reflective layer and the common interference layer is arranged between the absorber layer and the reflective layer.

9. An optically variable element according to claim 3, wherein the optically variable element has a substrate layer, wherein a surface relief is molded in a surface of the substrate layer and the surface relief differs in terms of the relief depth in the first, second, third and fourth zones.

10. An optically variable element according to claim 1, wherein each of the zones of the first color regions has a width or length of between 150 μm and 10 μm.

11. An optically variable element according to claim 1, wherein the surface proportion of the respective first color region which is covered by first, second, third, or fourth zones is varied to set the color value and the brightness of the respective image spot of the first area.

12. An optically variable element according to claim 1, wherein at least two of the first color regions have two or more first and two or more second zones wherein the two or more first and the two or more second zones are arranged in a pseudorandom arrangement in these color regions or the arrangement of the first and second zones differs in these color regions.

13. An optically variable element according to claim 1, wherein the optically variable element has two or more first color regions which, in the event of illumination at at least one particular angle of observation or angle of illumination, display to the human observer different colors, wherein the thickness of the interference layer of these color regions averaged in each case over the respective color region is identical or almost identical, and wherein the number and surface dimension of the sunk zones of at least one of these color regions is chosen such that the thickness of the interference layer of these color regions averaged in each case over the respective color region is identical.

14. An optically variable element according to claim 1, wherein the proportion of the sunk zones in the surface covered by the respective first color region is less than 20%.

15. An optically variable element comprising a first security feature disposed in a first area of the optically variable element and a second security feature disposed in a second area of the optically variable element separate from the first area, the first security feature comprising a plurality of color regions, each color region generating a mixed color in the event of illumination dependent on the angle of observation or angle of illumination, wherein each color region comprises a plurality of zones, the plurality of zones comprising:

a first zone having a width or length dimension of less than 300 μm and comprising a thin film interference filter having a reflective layer, an interference layer and an absorber layer, the interference layer having a first average thickness ($d_1$) which is chosen such that in the event of illumination at at least one particular angle of observation or angle of illumination generates a first color by means of interference;

a second zone arranged next to the first zone, the second zone having a width or length dimension of less than 300 μm and comprising a thin film interference filter having a reflective layer, an interference layer and an absorber layer, the interference layer having a second average thickness ($d_2$) which is chosen such that in the event of illumination at the at least one particular angle of observation or angle of illumination generates a second color by means of interference, the second color differing from the first color, and wherein the first average thickness ($d_1$) and the second average thickness ($d_2$) differ from each other by between 20 nm and 500 nm; and a sunk zone arranged next to at least one of the first and second zones, the sunk zone having a width or length dimension of less than 300 μm and comprising a thin film interference filter having a reflective layer, an interference layer and an absorber layer, the interference layer having an average thickness ($d_v$) of between 500 nm and 5000 nm, wherein the thickness of the interference layer of the thin film interference filter of the sunk zone is selected to ensure that the average thickness of the interference layer over all zones of each color region is substantially identical.

* * * * *